US008302549B2

(12) United States Patent
Templeman et al.

(10) Patent No.: US 8,302,549 B2
(45) Date of Patent: Nov. 6, 2012

(54) BOAT STABILIZER, BOAT MOTOR AND RELATED METHOD

(75) Inventors: Steven W. Templeman, Carthage, MO (US); Jon C. Templeman, Overland Park, KS (US)

(73) Assignee: Marine Dynamics, Inc., Lenexa, KS (US)

( * ) Notice: Subject to any disclaimer, the term of this patent is extended or adjusted under 35 U.S.C. 154(b) by 899 days.

(21) Appl. No.: 12/083,847

(22) PCT Filed: Oct. 6, 2006

(86) PCT No.: PCT/US2006/039526
§ 371 (c)(1),
(2), (4) Date: Apr. 18, 2008

(87) PCT Pub. No.: WO2007/047257
PCT Pub. Date: Apr. 26, 2007

(65) Prior Publication Data
US 2009/0314195 A1    Dec. 24, 2009

Related U.S. Application Data

(60) Provisional application No. 60/728,345, filed on Oct. 19, 2005.

(51) Int. Cl.
*B63B 1/24* (2006.01)
(52) U.S. Cl. ........................................................ 114/274
(58) Field of Classification Search .................... 114/274
See application file for complete search history.

(56) References Cited

U.S. PATENT DOCUMENTS

| 2,021,309 A | 11/1935 | Irgens |
| 2,319,640 A | 5/1943 | Sink |
| 2,963,000 A | 12/1960 | Fester |
| 2,998,795 A | 9/1961 | Downie et al. |
| 3,099,240 A | 7/1963 | Montague, Jr. |

(Continued)

FOREIGN PATENT DOCUMENTS

GB        716879        10/1954

(Continued)

OTHER PUBLICATIONS http://web.archive.org/web/20040629185923/marine-dynamics.com/StingRay.pdf, Dec. 11, 2004.*

(Continued)

*Primary Examiner* — Edwin Swinehart
(74) *Attorney, Agent, or Firm* — McAfee & Taft

(57) ABSTRACT

A boat stabilizer that is attachable to the anti-cavitation plate or other structure of the lower drive unit of a boat motor without permanently modifying the structure of the anti-cavitation plate or other structure is provided. The shape and size of the boat stabilizer causes the stabilizer to effectively harness and control the thrust energy generated by the propeller resulting in improved thrust and fuel efficiency. Due to various features, the drag associated with the boat stabilizer is kept to a minimum. Finally, decals and other decorative elements are integrally embedded into the top surface of the inventive boat stabilizer using in-mold decoration ("IMD") technology which makes the elements resistant to ultra-violet light, virtually indestructible and highly appealing. A boat motor, a method of attaching a boat stabilizer to a boat motor and a method of molding a boat stabilizer having at least one decorative element integrally embedded in the top surface thereof are also provided.

41 Claims, 19 Drawing Sheets

U.S. PATENT DOCUMENTS

| | | | |
|---|---|---|---|
| 3,114,343 | A | 12/1963 | Headrick et al. |
| 3,139,853 | A | 7/1964 | McCarthy et al. |
| 3,211,119 | A | 10/1965 | Kiekhaefer |
| 3,270,101 | A | 8/1966 | Jardine et al. |
| 3,343,512 | A | 9/1967 | Rasmussen |
| 3,433,195 | A | 8/1969 | Poole |
| 3,498,247 | A * | 3/1970 | Handler .................. 114/274 |
| 3,765,356 | A | 10/1973 | Cook |
| 3,964,417 | A | 6/1976 | Williams et al. |
| 4,040,373 | A | 8/1977 | Jones, Jr. |
| 4,205,618 | A | 6/1980 | Olsson |
| 4,304,557 | A | 12/1981 | Henrich |
| 4,323,355 | A | 4/1982 | Kondo |
| 4,352,666 | A | 10/1982 | McGowan |
| 4,377,123 | A | 3/1983 | Jackson |
| 4,487,152 | A | 12/1984 | Larson |
| 4,519,336 | A | 5/1985 | Mason |
| 4,597,742 | A | 7/1986 | Finkl |
| 4,708,672 | A | 11/1987 | Bentz et al. |
| 4,738,644 | A | 4/1988 | Happel |
| 4,744,779 | A | 5/1988 | Koehler |
| 4,748,927 | A | 6/1988 | Bujacich |
| 4,750,448 | A | 6/1988 | Hennebutte |
| 4,756,265 | A | 7/1988 | Lane |
| 308,851 | A | 6/1990 | Templeman |
| 311,513 | A | 10/1990 | Templeman |
| 4,967,682 | A | 11/1990 | O'Donnell |
| 4,968,275 | A | 11/1990 | Carlson |
| 4,977,847 | A | 12/1990 | Bartlett |
| 5,048,449 | A | 9/1991 | Templeman |
| 5,107,786 | A | 4/1992 | Templeman |
| 331,738 | A | 12/1992 | Simpson |
| 5,203,275 | A | 4/1993 | Brauner et al. |
| 5,231,950 | A | 8/1993 | Poulos |
| 351,129 | A | 10/1994 | Templeman |
| 352,023 | A | 11/1994 | Corn |
| 363,914 | A | 10/1995 | Corn |
| 5,516,315 | A | 5/1996 | Griffin |
| 5,551,369 | A | 9/1996 | Shen |
| 5,819,678 | A | 10/1998 | Austin |
| 7,115,007 | B2 | 10/2006 | Dulger |
| 2004/0115389 | A1* | 6/2004 | Goertz et al. .................. 428/98 |
| 2005/0076819 | A1 | 4/2005 | Hilleman |
| 2011/0315063 | A1 | 12/2011 | Templeman |

FOREIGN PATENT DOCUMENTS

SE          226596          5/1969

OTHER PUBLICATIONS

Jon C. Templeman, U.S. Appl. No. 10/749,147, filed Dec. 30, 2003.
Author unknown, "Stingray Hydrofoil Stabilizer," dated 1988, 4 total pages, Marine Dynamics, Inc., Overland Park, Kansas.
Author unknown, "Doel-Fin™ Boat Stabilizer," dated 1985, 2 page, Doelcher Products, Inc., Mission Hills, CA.
Author unknown, "Doel Fin—Not Just Another Gadget," Trailer Boat Magazine, published in Jul. 1979, 2 pages, publisher unknown.
Author unknown, "Boat Handling/Gas Saving Breakthrough" (regarding the Doel-Fin Boat Stabilizer), dated Sep. 1985, 1 page, Doelcher Products, Inc., place of publication unknown.
Author unknown, "Hydrofoil G.T.™," published in 1987, 1 page, Hydrofoil International Corp., Trailer Body Magazine.
Author unknown, "Sting Ray™ Torque Equalizers," dated 1988, 1 page, Marine Dynamics, Inc., place of publication unknown.
Author unknown, pictures and diagrams of drive units from Internet, date unknown—admitted prior art, 2 pages, Saro, www.sarodrive.com.
Author unknown, pictures of drive units from Internet, date unknown—admitted prior art, 2 pages, Arneson Industries, www.arneson-industries.com.
Author unknown, pictures of drive units from Internet, date unknown—admitted prior art, 2 pages, Q-SPD, www.q-spd.com.
Author unknown, pictures of drive units from Internet, date unknown—admitted prior art, 4 pages, unknown place of publication.
Author unknown, "Marine Performance Technology Exchange," Mar. 2004, 3 pages, Hydrocomp, Inc., Marine Performance Technology Exchange.
Author unknown, "Somos® 9120 Epoxy Photopolymer" Product Data Sheet, date unknown—admitted prior art, 1 page, DSM Somos®, New Castle, DE, place of publication unknown.
Author unknown, "Cast Urethanes," date unknown—admitted prior art, 1 page, Quickparts, unknown place of publication.
Author unknown, comments posted in 2004 on "Classically Whaler!, Continuous Wave" regarding "hydrofoil stabilizers," 2004, 8 pages, Clasically Whaler!, place of publication unknown.
Author unknown, "The Fastest Hydrofoil on Earth! Sting Ray™ Performance System Hydrofoil Stabilizers Torque Equalizers," published at least as early as 2006, 14 pages, Marine Dynamics, Inc., place of publication unknown.
Author unknown, printouts from web site, date unknown—admitted prior art, 10 pages, Sport Marine Technologies, www.sesport.com.
Author unknown, printout from Hydro-Shield's web site, date unknown—admitted prior art, 2 pages, Hydro-Shield, www.hydro-shield.com.
Author unknown, "Propeller Guard Information Center," dated Oct. 3, 2006, 16 pages, Propeller Guard Information Center, www.rbbi.com/pgic/.
"Saro Tunnel-Prop Drive," date unknown—admitted prior art, 3 pages, Saro, www.saro-bootsantriebe.de/html/technics.html; www.performanceimports.co.nz/saro.html.
Herbert, James W. Propeller Basics: Bow Life and Stern Lift. pp. 1-4 2001. Currently published on Internet at http:// continuouswave.com/whaler/reference/prop3.html.
Johnson, C. Ducted Boat Propeller. p. 1 2000. Currently published on Internet at http://www.mb-soft.com/public/ductprop.html.

* cited by examiner

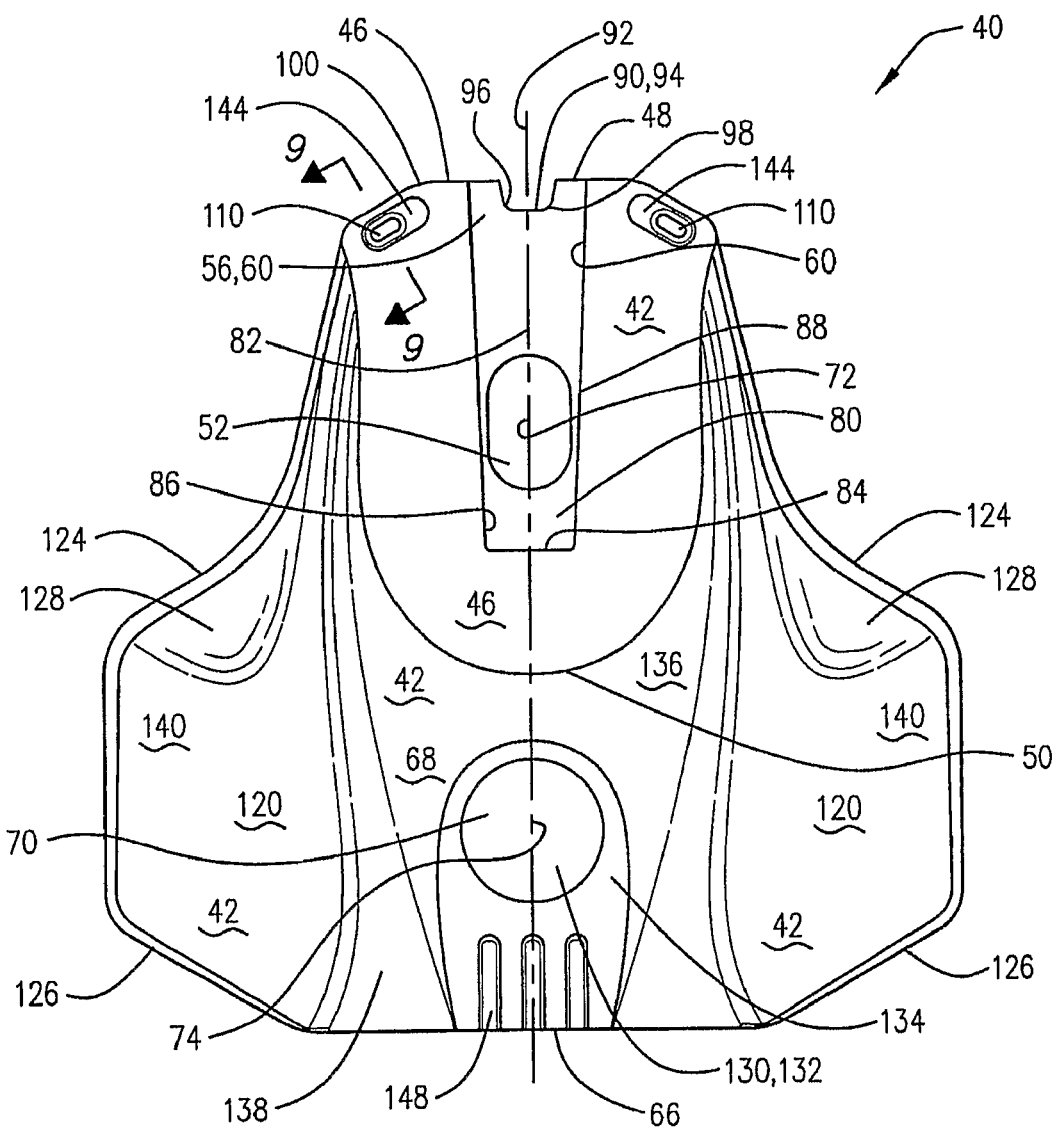
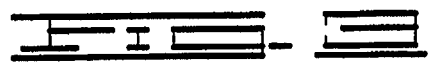
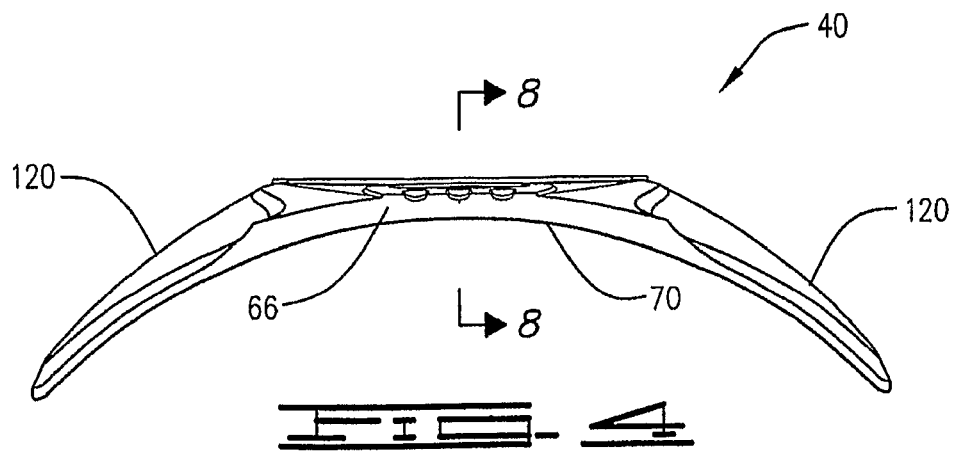
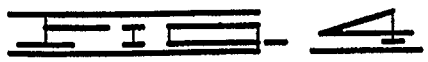

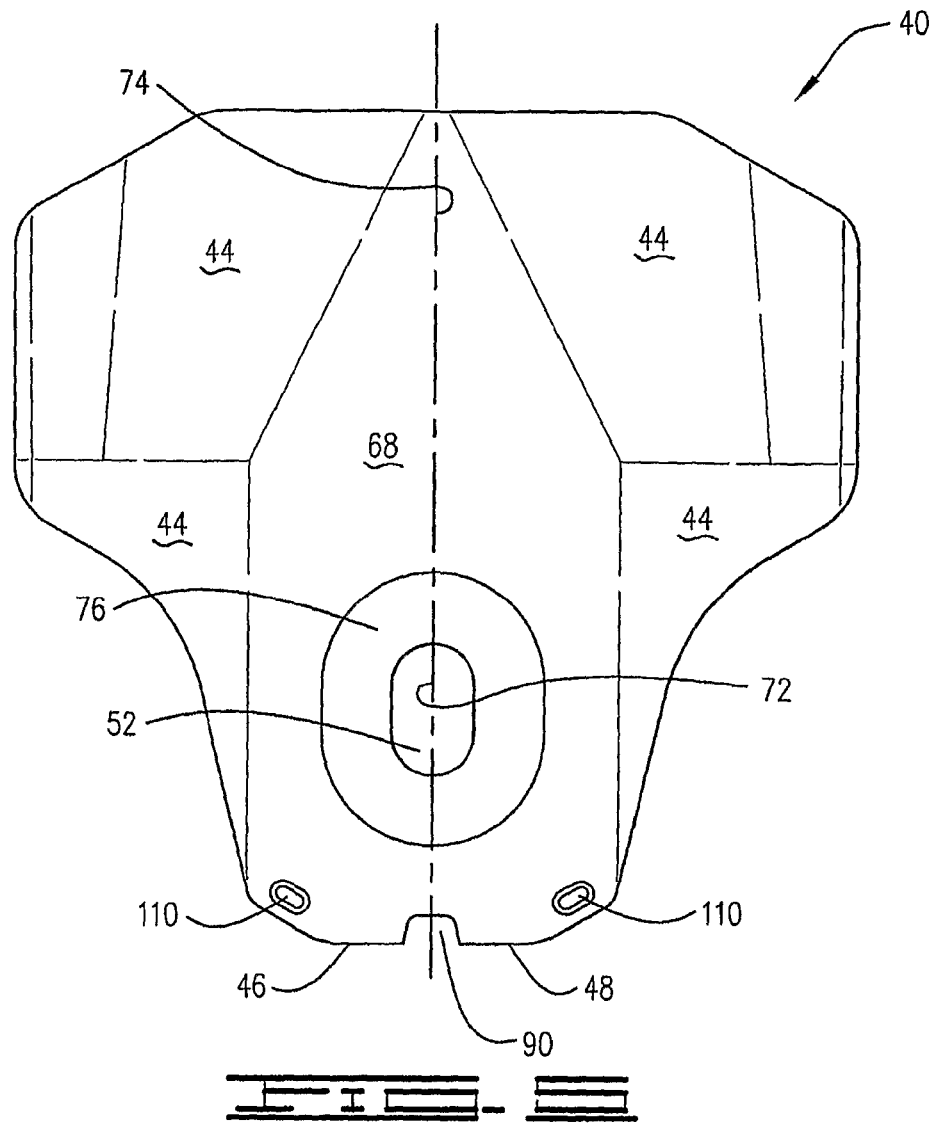
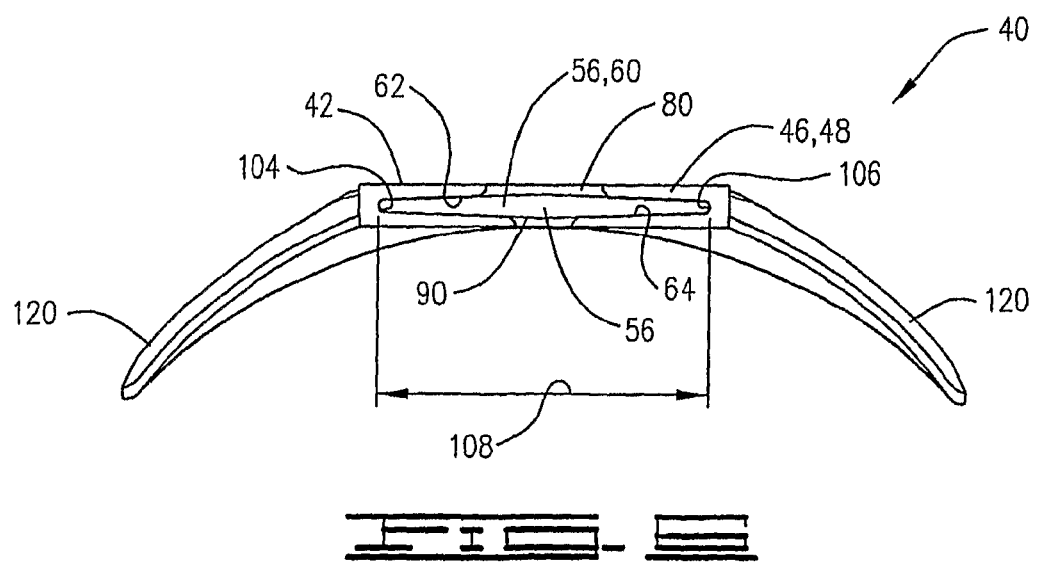

BOAT STABILIZER, BOAT MOTOR AND RELATED METHOD

BACKGROUND OF THE INVENTION

The present invention relates to boat stabilizers that are attachable to the lower drive unit of a boat motor to provide lift to the stern of the boat and otherwise improve the performance of the boat. The invention also relates to boat motors having a boat stabilizer attached thereto, methods of attaching a boat stabilizer to the lower drive unit of a boat motor and methods of manufacturing boat stabilizers.

It is known that the stability, performance, fuel efficiency and safety of certain types of boats (for example, ski boats, bass boats, pontoon boats and the like) can be improved by the addition of an after-market boat stabilizer to the lower drive unit of the boat motor. Such boat stabilizers, often referred to as hydrofoil stabilizers or hydrofoils, are typically designed to fit around the rear of the drive unit over or under the anti-cavitation plate thereof. The boat stabilizers are bolted on to the anti-cavitation plate. Examples are shown by U.S. Pat. Nos. Des. 308,851 (issued Jun. 26, 1990), 5,048,449 (issued Sep. 17, 1991), 5,107,786 (issued Apr. 28, 1992) and Des. 351,129 (issued Oct. 4, 1994), all assigned to the assignee of the present application.

A problem inherent in the after-market boat stabilizers used heretofore is that they are bolted directly on to the anti-cavitation plate of the boat motor. This requires that holes (typically 4 or more) be drilled through the anti-cavitation plate. Many boat owners simply do not want to permanently modify the structure of their lower drive units in this manner. Furthermore, drilling the holes in the precise location needed can be difficult. The boat stabilizer needs to be installed in a position that is perpendicular to the longitudinal axis of the engine and in a manner that does not leave any gaps or spaces between the boat stabilizer and the anti-cavitation plate. Gaps and open spaces between the boat stabilizer and anti-cavitation plate can hold water which creates unnecessary drag. In addition, drilling holes in the anti-cavitation plate can void the engine manufacturer's anti-corrosion protection warranty on new engines.

Another problem associated with the boat stabilizers currently available is that the stabilizers do not sufficiently harness the thrust energy generated by rotation of the boat motor propeller. Rotation of the propeller pushes water to the rear, thereby propelling the boat forward. Unfortunately, a great deal of the thrust energy created by the boat motor is lost. Rotation of the propeller imparts a substantially outward, radial force to the water. As the outward, radial force is uniform and symmetric, the associated force vectors tend to cancel out. Only the rearward component of the generated water column, referred to the "thrust cone," imparts forward thrust to the boat. The diameter of the thrust cone increases with the length of the thrust cone. As a result, some of the water in the thrust cone ultimately is thrown above the surface and into the air, which causes the thrust energy associated therewith to be released and lost. The thrust cone associated with many boats, even when an existing boat stabilizer is utilized, reaches the surface too quickly. For example, boats that create large "rooster tails" are not operating very efficiently.

Yet another problem associated with many existing boat stabilizers is stabilizer drag. Drag is the result of friction generated by water flowing over the stabilizer as the stabilizer traverses through the water. The faster the product traverses through the water the greater the drag. Many boat stabilizers on the market do not sufficiently address the problem of drag.

Finally, the overall appearance and look of many boat stabilizers rapidly diminishes upon use of the stabilizers. Boat stabilizers are typically molded out of a polymer material by an injection molding process. The molten material is caused to swirl in the mold which results in flow or knit marks in the finished product. In an attempt to improve the aesthetics of the boat stabilizer, many manufacturers place decals (including brand names and logos and/or other decorative elements) on the top surface of the stabilizer. The decals cover up the flow or knit marks on the top surface of the stabilizer. Unfortunately, due to debris in the water and other factors, the decals get beat up and wear out fairly quickly. Even when decals are not used, the top surface of the stabilizer can become worn looking in a relatively short amount of time.

By the present invention, a boat stabilizer has been developed that overcomes the aforementioned problems. The inventive boat stabilizer can be attached to the lower drive unit of a boat motor without permanently modifying the structure of the boat motor. The shape and size of the inventive boat stabilizer causes the stabilizer to effectively harness and control the thrust energy generated by the propeller resulting in greatly improved thrust and fuel efficiency. Due to various features, the drag associated with the inventive boat stabilizer is kept to a minimum. Finally, decals and other decorative elements are integrally embedded into the top surface of the inventive boat stabilizer using in-mold decoration ("IMD") technology which makes the elements resistant to ultraviolet light, virtually indestructible and highly appealing.

SUMMARY OF THE INVENTION

In accordance with the present invention, a boat stabilizer is provided which overcomes the deficiencies of the prior art described above and has other advantages as well.

In one aspect, the invention is a boat stabilizer that is attachable to the lower drive unit of a boat motor (in a manner that allows the stabilizer to function for its intended purpose) without permanently modifying the structure of the lower drive unit. The boat stabilizer comprises a top surface, a bottom surface, a nose portion that includes a front end and a rear end, a tail opposing the nose portion and a main body connecting the nose portion and tail together. The main body includes a wing section for providing lift to the stern of the boat during operation of the boat. Means are associated with the nose portion for attaching said nose portion to the lower drive unit without permanently modifying the structure of the lower drive unit.

In a preferred embodiment, the boat stabilizer is attachable to the lower drive unit of a boat motor that includes an anti-cavitation plate above the propeller and a torque tab (or sacrificial anode) attached to the bottom of the anti-cavitation plate by a fastening device that extends through an opening in the anti-cavitation plate. In this embodiment, the nose portion of the boat stabilizer includes an opening that extends through the top and bottom surfaces of the nose portion and can be aligned with the opening in the anti-cavitation plate and receive the fastening device. The means associated with the nose portion for attaching the nose portion to the lower drive unit without permanently modifying the structure of the lower drive unit includes the opening in said nose portion.

The nose portion of the inventive boat stabilizer further includes a slot for receiving a portion of the lower drive unit of the boat motor. The means associated with the nose portion for attaching the nose portion to the lower drive unit without permanently modifying the structure of the lower drive unit includes the slot. In a preferred embodiment, the slot extends through the front end toward the rear end of the nose portion of the boat stabilizer and defines a substantially horizontal receptacle for receiving a portion of the lower drive unit (for example, the anti-cavitation plate of the lower drive unit). The slot includes an upper surface and a lower surface that can be clamped together to attach the nose portion to the lower drive unit (for example, the anti-cavitation plate) without permanently modifying the structure of the lower drive unit (for example, the anti-cavitation plate). An aperture extends through the top and bottom surfaces of the nose portion and through the upper and lower surfaces of the slot for receiving a fastening device (for example, a nut and bolt) for clamping the upper and lower surfaces of the slot together.

The slot of the nose portion preferably has a depth in the range of from about 5 inches to about 15 inches, more preferably about 8 inches to about 12 inches, and most preferably about 10 inches. The slot of the nose portion preferably has a width in the range of from about 4 inches to about 12 inches, more preferably about 6 inches to about 10 inches, and most preferably about 7 inches. The slot of the nose portion preferably has a thickness in the range of from about 0.125 inches to about 1.25 inches, more preferably about 0.25 inches to about 0.75 inches, and most preferably about 0.5 inches.

The inventive boat stabilizer further comprises a pair of opposing wing tips, each of the wing tips being attached to and extending outwardly and downwardly with respect to the main body and having a leading edge and a trailing edge. When the boat stabilizer is installed on the lower drive unit, the wing tips curve down toward the propeller of the boat motor. Compared to some boat stabilizers used heretofore, the width of the inventive boat stabilizer is relatively narrow. However, when installed, the inventive boat stabilizer extends further down and around and further behind the propeller of the boat motor than boat stabilizers used heretofore. In this way, the inventive boat stabilizer maximizes the use of the thrust energy generated by the boat motor and propeller. The thrust energy is kept within the thrust cone. It is in the first few inches beyond the back of the propeller hub where the thrust energy is lost in a conventional outboard or stern drive system. It is in this same area that the inventive boat stabilizer directly addresses and solves the problem. Cavitation and "rooster tailing" are greatly reduced. As a result, increased speed, reduced fuel consumption and a better "holeshot" can be achieved.

Two key elements of the inventive boat stabilizer help keep the thrust energy in the thrust cone and thereby allow the stabilizer to make more efficient use of the thrust energy generated by the boat motor and propeller. The first is the length of the stabilizer and the second is the wing tip drop.

The inventive boat stabilizer is long enough to counter the effects of cavitation and retain the thrust within the thrust cone, yet not so long that it increases the drag to an unacceptable extent. In one embodiment (designed for use with boat motors having up to 350 HP), the boat stabilizer preferably has an overall length in the range of from about 13.375 inches to about 20.125 inches, more preferably in the range of from about 16.5 inches to about 17.875 inches. In a second embodiment (designed for use with boat motors having up to 75 HP), the boat stabilizer preferably has an overall length in the range of from about 9 inches to about 13.5 inches, more preferably in the range of about 10.5 inches to about 12 inches.

In addition to the length of the boat stabilizer, it is important to get the proper vertical drop of the boat stabilizer wing tips. The effect of the wing tips on the thrust is that they retain the radially vectored thrust within the thrust cone without physically impinging the thrust cone. Accordingly, the wing tips of the inventive stabilizer are configured to extend in a downward position and arranged in a radius above the arc of the propeller. Each of the wing tips of the inventive boat stabilizer preferably extends downwardly with respect to the main body by a distance in the range from about 0.3125 inches to about 7.785 inches. Each of said wing tips preferably extend outwardly with respect to the said main body by a distance in the range of from about 6 to about 9 inches.

The inventive boat stabilizer includes many features and elements that function to reduce resistance or drag. For example, the overall shape and dimensions of the stabilizer are designed to reduce drag. Each wing tip is sculpted to include an indentation in the top surface thereof. The indentation is positioned adjacent to the leading edge of the wing tip and helps decrease the resistance of and keep the drag coefficient created by the boat stabilizer to a minimum. Further, the boat stabilizer is integrally formed as a one-piece unit which helps reduce drag. The top surface of the stabilizer includes a recessed section that extends around each of the apertures in the nose portion that receive a fastening devise for clamping the stabilizer on to the anti-cavitation plate. Covers fit within the recessed sections and cover said apertures and any fastening devices therein. This also reduces drag. In addition, the polymer composition used to form the boat stabilizer includes a hydrophilic additive which reduces drag.

The inventive boat stabilizer also comprises at least one decorative element that is integrally embedded in the top surface of the boat stabilizer. In a preferred embodiment, the boat stabilizer is molded out of a polymer composition, and the decorative element is embedded in the top surface of the boat stabilizer during the process used to mold the boat stabilizer. For example, the decorative element can be an overlay or logo. IMD technology is utilized. The decorative element is fused into the boat stabilizer during the molding process and creates a seamlessly integrated decorative product and identifier which functions to hide production marks such as flow marks or knit marks. As the decorative element is embedded in the stabilizer during the molding process and fused therewith, it does not wear off during use. It is highly resistant to scratching, scuffing, fading, detergents, hydrocarbon based chemicals and ultraviolet radiation. Additionally, because of the unique in-mold decoration process technology, the final product retains its original properties including shrinkage and flexibility. Further, the in-mold decoration technology allows the incorporation of different protective coatings such as an ultraviolet protective coating.

The in-mold decoration process starts with the layering of the film structure with the decorative element. A metallic or metallized material can be used as or as part of the decorative element. Once the layering step is complete, the decorative element is printed and any desired coatings are applied. The printed and coated product is then die cut (trimmed) to the shape of the boat stabilizer or to the particular area where the decorative element is to be placed. The final product is then included in the injection molding process where the printed and coated in-mold decoration film conforms to the texture of the stabilizer.

The invention also includes a boat motor comprising an engine, a lower drive unit attached to the engine, and a boat stabilizer that can be removably attached to the lower drive unit to provide lift to the stern of the boat during operation of the boat without permanently modifying the structure of the lower drive unit. The lower drive unit includes a propeller, an anti-cavitation plate positioned above the propeller and a torque tab attached to the bottom surface of the anti-cavitation plate by a torque tab fastening device (for example, a nut and bolt). The boat stabilizer of the boat motor is the inventive boat stabilizer discussed above.

The invention also includes a method of removably attaching a boat stabilizer that includes a nose portion, a tail and a main body connecting the nose portion to the tail and including a wing section to the lower drive unit of the boat motor. The method comprises fastening the nose portion of the boat stabilizer to the lower drive unit without permanently modifying the structure of the lower drive unit. In one embodiment, the nose portion of the boat stabilizer is clamped to the anti-cavitation plate of the lower drive unit.

The invention also includes a method of attaching a boat stabilizer having nose portion including an opening extending therethrough, a tail and a main body connecting the nose portion and tail together and including a wing section to the anti-cavitation plate of the lower drive unit of the boat motor without permanently modifying the structure of the anti-cavitation plate.

The invention also includes a method of molding a boat stabilizer out of a polymer material (for example, a thermoplastic material) with the boat stabilizer having at least one decorative element embedded in the top surface thereof.

BRIEF DESCRIPTION OF THE DRAWINGS

FIG. 3 is a top view of the boat stabilizer illustrated by FIG. 2.

FIG. 4 is a rear view of the boat stabilizer illustrated by FIG. 2.

FIG. 5 is a bottom view of the boat stabilizer illustrated by FIG. 2.

FIG. 6 is a front view of the boat stabilizer illustrated by FIG. 2.

DESCRIPTION OF THE PREFERRED EMBODIMENTS

Figure 1:
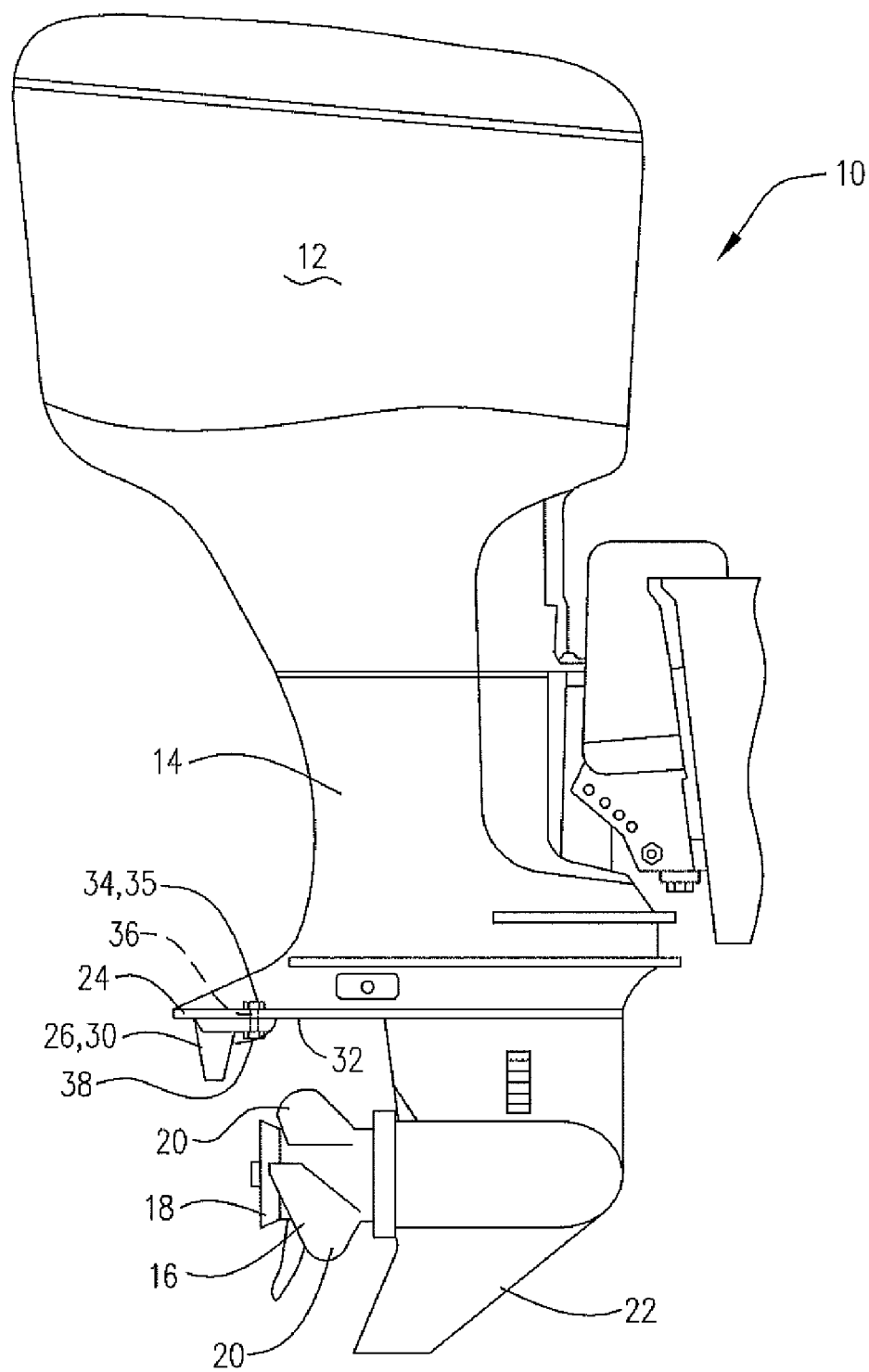
FIG. 1 illustrates a conventional outboard boat motor and associated lower drive unit.
Figure 2:
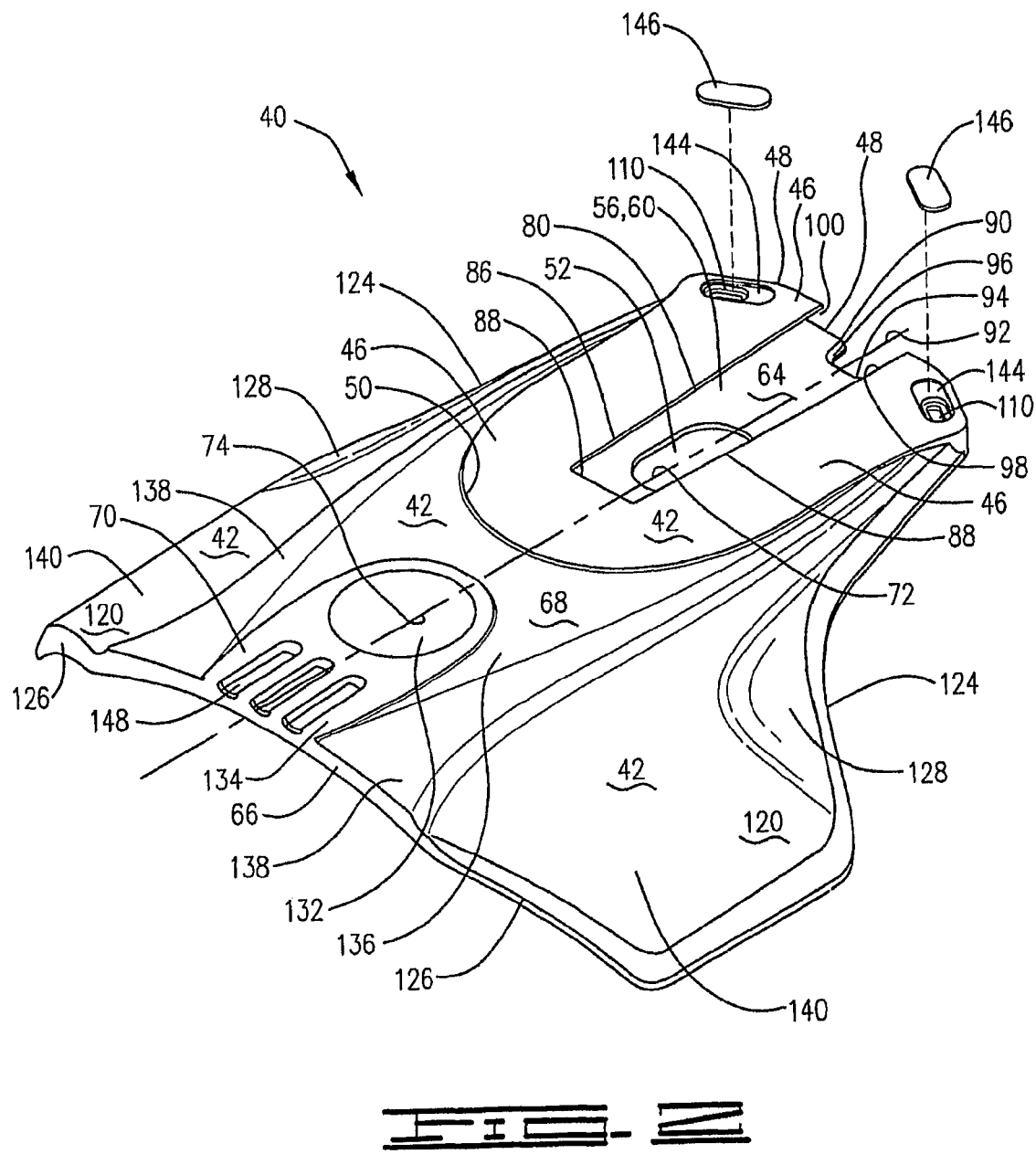
FIG. 2 is a perspective view of the inventive boat stabilizer.
Figure 7:
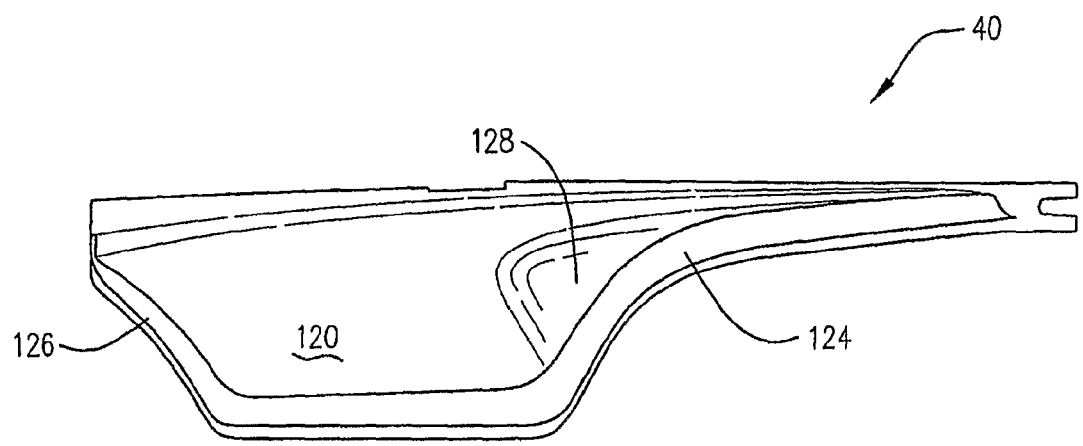
FIG. 7 is a side view of the boat stabilizer illustrated by FIG. 2.
Figure 8:
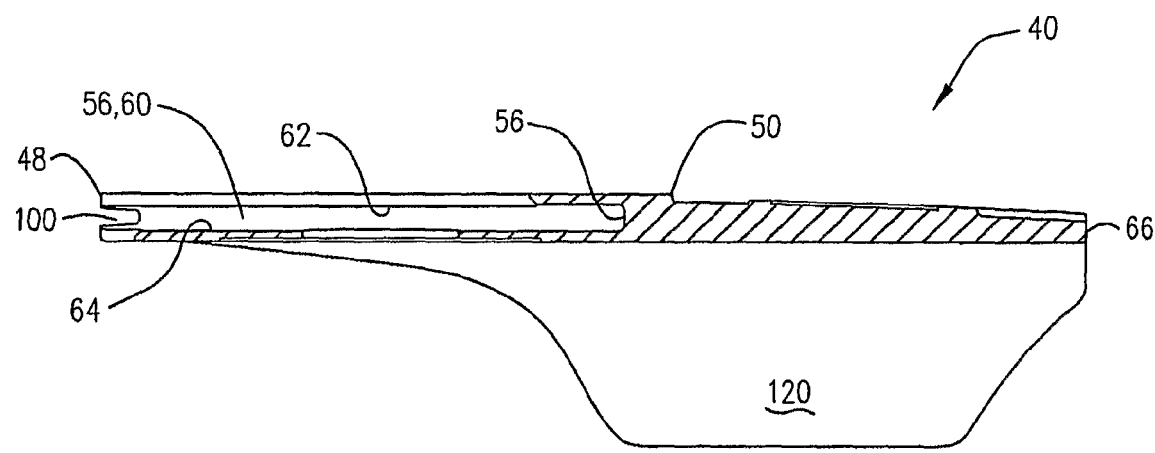
FIG. 8 is a sectional view taken along line 8-8 of FIG. 4.
Figure 9:
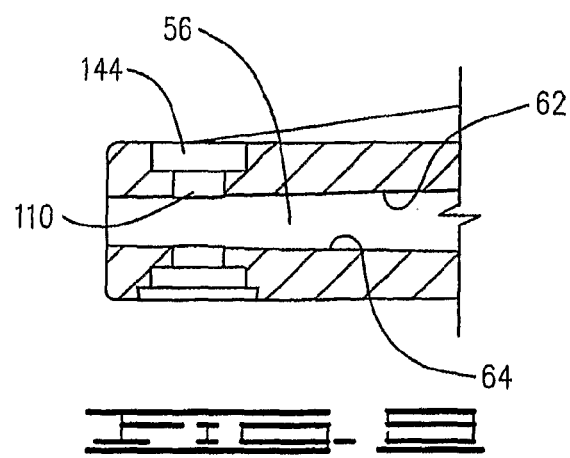
FIG. 9 is a sectional view taken along line 9-9 of FIG. 3.

Referring now to the drawings, and particularly to FIG. 1, a boat motor suitable for use in connection with the present invention is illustrated and generally designated by the numeral 10. The boat motor 10 includes an engine 12 (illustrated with the engine cover or housing attached to the engine) and a lower drive unit 14 attached thereto. Although the boat motor 10 shown in FIG. 1 is an outboard motor, other types of motors including motors having stern drive units can also be used in association with the present invention. For example, with respect to the present invention, the lower drive unit 14 is the same regardless of whether the boat motor 10 is an outboard or a stern drive.

As shown by FIG. 1, the lower drive unit 14 includes a propeller 16 including a propeller hub 18 and a plurality of blades 20. A skeg 22 is attached to the lower drive unit 14 and extends below the propeller 16. An anti-cavitation plate 24 is also attached to the lower drive unit 14 and is disposed in a spaced relationship to and above the propeller 16 to eliminate and reduce certain cavitation effects that would otherwise be created by rotation of the propeller. Virtually every outboard and inboard/outboard motor includes an anti-cavitation plate such as the anti-cavitation plate 24.

A torque tab 26 is attached to the anti-cavitation plate 24. As used herein and in the appended claims, the term "torque tab" includes torque tabs, sacrificial anodes and similar apparatus mounted to the anti-cavitation plate. The torque tab 26, which includes a base 28 and a tab 30, is removably attached to the bottom 32 of the anti-cavitation plate 24 by a fastening device 34. The fastening device 34 includes a bolt 35 which extends through a corresponding opening 36 in the cavitation plate. The bolt 35 screws directly into the torque tab 26 to fasten the torque tab to the anti-cavitation plate 24. Alternately, a nut 38 is tightened to the bolt 35 to fasten the torque tab 26 to the anti-cavitation plate 24. By loosening the fastening device 34, the torque tab 26 can be rotated right or left with respect to the anti-cavitation plate 24 as necessary to counteract the torque created by rotation of the propeller 16.

Referring now to FIGS. 2-8, the inventive boat stabilizer is illustrated and generally designated by the numeral 40. The boat stabilizer 40 is attachable to a lower drive unit of a boat motor that includes an anti-cavitation plate positioned above a propeller and a torque tab attached to the bottom of the anti-cavitation plate by a torque tab fastening device (for example, a nut and bolt) that extends through a corresponding opening in the anti-cavitation plate; that is, the boat stabilizer 40 is attachable to a lower drive unit of a boat motor such as the lower drive unit 14 shown by FIG. 1. The boat stabilizer 40 is attachable to the lower drive unit (in a manner that allows the stabilizer to function for its intended purpose) without permanently modifying the structure of the lower drive unit. For example, the boat stabilizer can be installed without drilling holes in the anti-cavitation plate or other structure of the lower drive unit.

The boat stabilizer 40 comprises a top surface 42, a bottom surface 44, and a nose portion 46. The nose portion 46 includes a front end 48, a rear end 50 and an opening 52 that is disposed between the front and rear ends. The opening 52 extends through the top and bottom surfaces 42 and 44 of the nose portion 46 and can be aligned with the opening in the anti-cavitation plate (e.g., the opening 36 as shown by FIG. 1) to receive a torque tab fastening device (e.g., the bolt 35 as shown by FIG. 1). This allows the nose portion 46 to be attached to the anti-cavitation plate by the torque tab fastening device (e.g., the nut 38 and the bolt 35 as shown by FIG. 1).

The nose portion further includes a slot 56 extending through the front end 48 toward said rear end 50 and defining a substantially horizontal receptacle 60 for receiving the anti-cavitation plate. The slot 56 includes an upper surface 62 and a lower surface 64 that can be clamped together to hold the nose portion 46 onto the anti-cavitation plate. As used herein and in the appended claims, the designations "horizontal" and "vertical" apply to the orientation of the components of the invention as such components are illustrated in the accompanying drawings.

The boat stabilizer 40 further includes a tail 66 opposing the nose portion 46 and a main body 68 connecting the nose portion and the tail together. The main body 68 includes a wing section 70 for providing lift to the stern of the boat during operation of the boat.

The opening 52 in the nose portion 46 of the boat stabilizer 40 is elongated and has a longitudinal axis 72 that is substantially parallel to the longitudinal axis 74 of the boat stabilizer. As shown, the opening 52 has an oval cross-sectional shape. The opening 50 can have other cross-sectional shapes as well, such as a rectangular cross-sectional shape.

As best shown by FIG. 5, the bottom surface 44 of the boat stabilizer 40 includes a recessed area 76 around the opening 52 in the nose portion 46 for receiving the base of the torque tab of the lower drive unit (such as the base 28 as shown in FIG. 1). For example, the base of the torque tab (such as the base 28 as shown in FIG. 1) fits snugly within the recessed area 76.

The nose portion 46 of the boat stabilizer 40 further includes an upper notch 80 for receiving a portion of the lower drive unit. Upper notch 80 extends from the front end 48 of the nose portion 46 to the rear end 50 of the nose portion and through the top surface 42 of the boat stabilizer 40. The upper notch 80 has a longitudinal axis 82 that is substantially parallel to the longitudinal axis 74 of the boat stabilizer and includes a back wall 84 and opposing side walls 86 and 88.

The nose portion 46 of the boat stabilizer 40 further includes a lower notch 90 for receiving a portion of the lower drive unit. The lower notch 90 extends from the front end 48 of the nose portion 46 toward the rear end 50 of the nose portion and through the bottom surface 44 of the boat stabilizer 40. The lower notch 90 has a longitudinal axis 92 that is substantially parallel to the longitudinal axis 74 of the boat stabilizer 40 and includes a back wall 94 and a pair of opposing side walls 96 and 98.

The slot 56 has an open front end 100 adjacent to the front end 48 of the nose portion 46 and a rear end 102. A pair of opposing side walls 104 and 106 extend from the open front end 100 to the rear end 102. The open front end 100 of the slot 156 has a width 108 that is greater than the width of the rear end 102 of the slot 56 and greater than the width of the anti-cavitation plate.

A pair of apertures 110 extend through the top surface 42 and bottom surface 44 of the nose portion 46 and through the upper surface 62 and lower surface 64 of the slot 56. Each aperture 110 is disposed adjacent to the open front end 100 and a side wall (104 or 106) of the slot 56. The apertures 110 receive a fastening device (for example a bolt) for clamping the upper surface 62 and lower surface 64 of the slot 56 together and attaching the nose portion 46 to the anti-cavitation plate without permanently modifying the structure of the anti-cavitation plate. If a bolt is used, a nut is tightened to the bolt to achieve the clamping mechanism.

The boat stabilizer 40 further comprises a pair of opposing wing tips 120, each of the wing tips being attached to and extending outwardly and downwardly with respect to the main body 68 and having a leading edge 124 and a trailing edge 126. Each of the wing tips 120 includes an indentation 128 in the top surface 42 thereof. The indentation 128 is positioned adjacent to the leading edge 124 of the wing tip 120. By sculpting the top surface 42 of the wing tips along the leading edges thereof; i.e., by including the indentations 128, the drag resistance created by the boat stabilizer 40 is reduced and the drag coefficient corresponding to the boat stabilizer is kept to a minimum.

The boat stabilizer 40 further comprises a plurality of decorative elements 130 that are integrally embedded in the top surface 42 of the boat stabilizer. The decorative elements 130 include a domed logo plate 132, a chrome overlay 134 surrounding the logo plate, a stainless steel overlay 136 covering a large portion of the top surface 42 of the boat stabilizer 40, a pair of red flame stripes 138 and a carbon fiber overlay 140 extending over each of the wing tips 120.

The boat stabilizer 40 is preferably formed in an injection mold out of a polymer composition (e.g., a thermoplastic composition such as polypropylene). As explained below, utilizing IMD technology, the decorative elements 130 are integrally embedded in the top surface 42 of the boat stabilizer 40 during the molding process. The decorative elements 130 are highly resistant to scratching, fading, detergents, hydrocarbon based chemicals and ultraviolet radiation.

The top surface 42 of the boat stabilizer 40 further comprises a pair of recessed sections 144 extending around the apertures 110. A pair of covers 146 fit within the recessed sections 144 to cover the apertures 110 and any fastening device therein. The covers 146 decrease the resistance created by the boat stabilizer 40.

The top surface of the boat stabilizer 40 further includes a plurality of longitudinal recessed sections 148 that are positioned side by side in the top surface and extend from the tail 56 toward the nose portion 46 of the boat stabilizer. The recessed sections 148 also help reduce drag. Except for the covers 146, the boat stabilizer is integrally formed as a one piece unit.

The embodiment of the boat stabilizer shown by FIGS. 1-9 is most useful in connection with outboard (stern drive) motors up to 350 horsepower. The specific embodiment of the stabilizer 40 shown in FIGS. 1-9 has an overall length of approximately 17⅞ inches and an overall width of approximately 18 inches. The width of the front end 48 of the nose portion 46 and hence the approximate width of the open front end 100 of the slot 156 is approximately 7 3/16 inches. The slot 56 has a depth of about 10 inches, and a thickness of about 0.5 inches.

Figure 10:
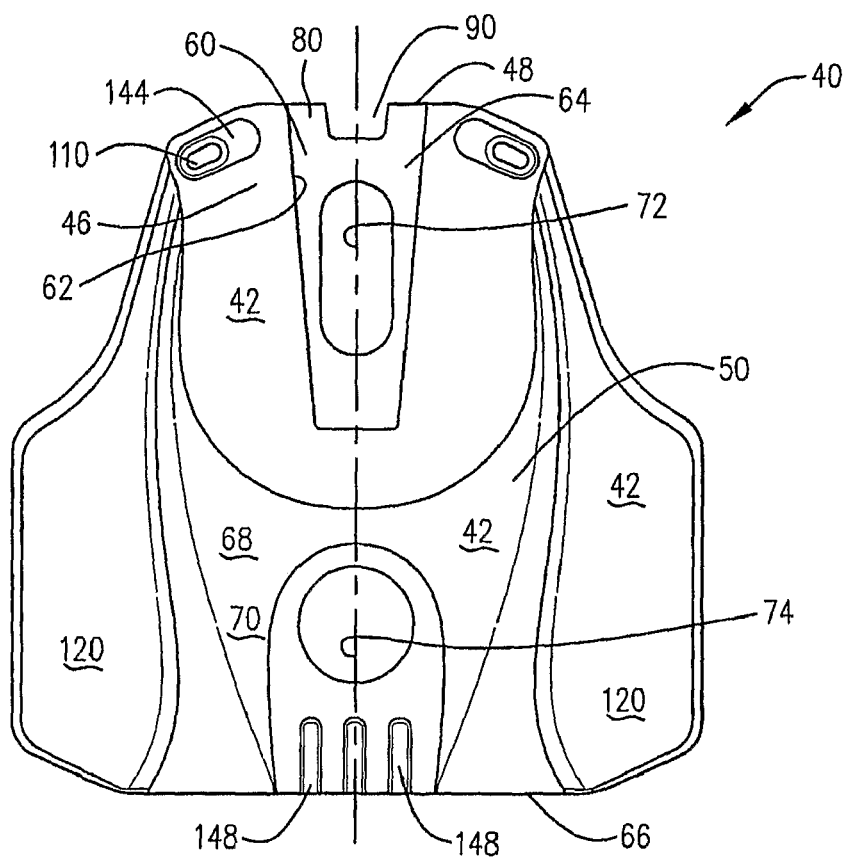
FIG. 10 is a top view of another embodiment (a smaller embodiment) of the inventive boat stabilizer.
Figure 11:
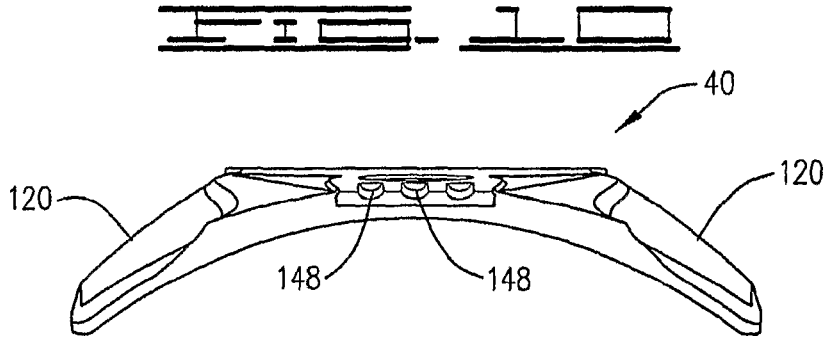
FIG. 11 is a rear view of the boat stabilizer illustrated by FIG. 10.
Figure 12:
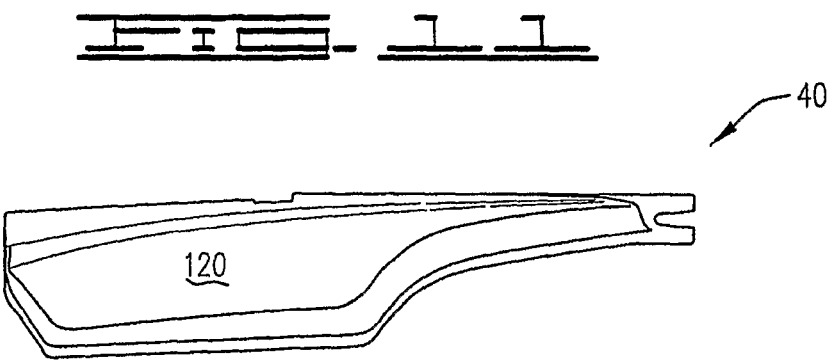
FIG. 12 is a side view of the boat stabilizer illustrated by FIG. 10.

FIGS. 10-12 illustrate a smaller embodiment of the boat stabilizer 40. Except for its size, the embodiment of the boat stabilizer 40 illustrated by FIGS. 10-12 is essentially the same as the body of the inventive boat stabilizer illustrated by FIGS. 1-9. The specific embodiment of the stabilizer 40 illustrated by FIGS. 10-12 has an overall length of approximately 12 inches and an overall width of approximately 12 inches. The width of the front end 48 of the nose portion 46 and hence the approximate width of the open front end 100 of the slot 56 is about 6⅛ inches.

When the boat stabilizer 40 is installed on the lower drive unit, the wing tips 120 curve down toward the propeller of the boat motor. Compared to some boat stabilizers used heretofore, the overall width of the inventive boat stabilizer 40 (both the embodiment shown by FIGS. 1-9 and the embodiment shown by FIGS. 10-12) is relatively narrow. However, when installed, the inventive boat stabilizer 40 extends further down and around and further behind the propeller of the boat motor than boat stabilizers used heretofore. In this way, the inventive boat stabilizer maximizes the use of the thrust energy generated by the boat motor and propeller.

In the embodiment shown by FIGS. 1-9 (designed for use with boat motors having up to 350 HP), the boat stabilizer 40 preferably has an overall length in the range of from about 13.375 inches to about 20.125 inches, more preferably in the range of from about 16.5 inches to about 17.875 inches. In the embodiment shown by FIGS. 10-12 (designed for use with boat motors having up to 75 HP), the boat stabilizer preferably has an overall length in the range of from about 9 inches to about 13.5 inches, more preferably in the range of from about 10.5 inches to about 12 inches.

Each of said wing tips of the inventive boat stabilizer preferably extends downwardly with respect to the main body by a distance in the range from about 0.3125 inches to about 7.785 inches. Each of said wing tips preferably extend outwardly with respect to the said main body by a distance in the range of from about 6 to about 9 inches.

As best illustrated by FIG. 1, FIGS. 13A through 13G, FIGS. 14A and 14B and FIGS. 15A and 15B, the invention also includes a boat motor 10. The boat motor 10 includes an engine 12 (illustrated with the engine cover or housing attached to the engine), a lower drive unit 14 attached to the engine, and a boat stabilizer 40 (not shown in all of the figures) removably attached to the lower drive unit to provide lift to the stern of the boat during operation of the boat without permanently modifying the structure of the lower drive unit. Although the boat motor 10 shown in the drawings is an outboard motor, other types of motors including motors with stern drive units can also be used in association with the present invention. For example, with respect to the present invention, the lower drive unit 14 is the same regardless of whether the boat motor 10 is an outboard or a stern drive motor.

The lower drive unit 14 includes a propeller 16 including a propeller hub 18 and a plurality of blades 20. A skeg 22 is attached to the lower drive unit 14 and extends below the propeller 16. An anti-cavitation plate 24 is also attached to the lower drive unit 14 and is disposed in a spaced relationship to and above the propeller 16 to eliminate and reduce certain cavitation effects that would otherwise be created by rotation of the propeller. Virtually every outboard and inboard/outboard motor includes an anti-cavitation plate such as the anti-cavitation plate 24.

A torque tab 26 is attached to the anti-cavitation plate 24. The torque tab 26, which includes a base 28 and a tab 30, is removably attached to the bottom 32 of the anti-cavitation plate 24 by a fastening device 34. The fastening device 34 includes a bolt 35 which extends through a corresponding opening 36 in the cavitation plate. The bolt 35 screws directly into the torque tab 26. Alternately, a nut 38 is tightened to the bolt 35 to fasten the torque tab 26 to the anti-cavitation plate 24. By loosening the fastening device 34, the torque tab 26 can be rotated right or left with respect to the anti-cavitation plate 24 as necessary to counteract the torque created by rotation of the propeller 16.

The boat stabilizer 40 is the inventive boat stabilizer 40 described above. The opening 52 in the nose portion 46 of the boat stabilizer 42 is aligned with the opening 36 in the anti-cavitation plate 24 and receives the torque tab fastening device 34 (namely, the bolt 35) whereby the nose portion can be attached to the anti-cavitation plate by the torque tab fastening device. Specifically, the nut 38 is tightened to the bolt 35 to fasten the nose portion 46 to the anti-cavitation plate 24. The receptacle 60 defined by the slot 56 receives the anti-cavitation plate 24. The upper and lower surfaces 62 and 64 of the slot 56 are clamped together to hold the nose portion 146 onto the anti-cavitation plate 24. Specifically, a bolt 160 is extended through each of the apertures 110, and a nut 162 is tightened onto each of the bolts to clamp the upper and lower surfaces 62 and 64 together.

Referring now to FIGS. 13A through 13G, the method by which the inventive boat stabilizer 40 is attached to the lower drive unit 14 of the boat motor 10 without permanently modifying the structure of the anti-cavitation plate 24 or otherwise modifying the structure of the lower drive unit 14 or boat motor is illustrated and described.

Figure 13A:
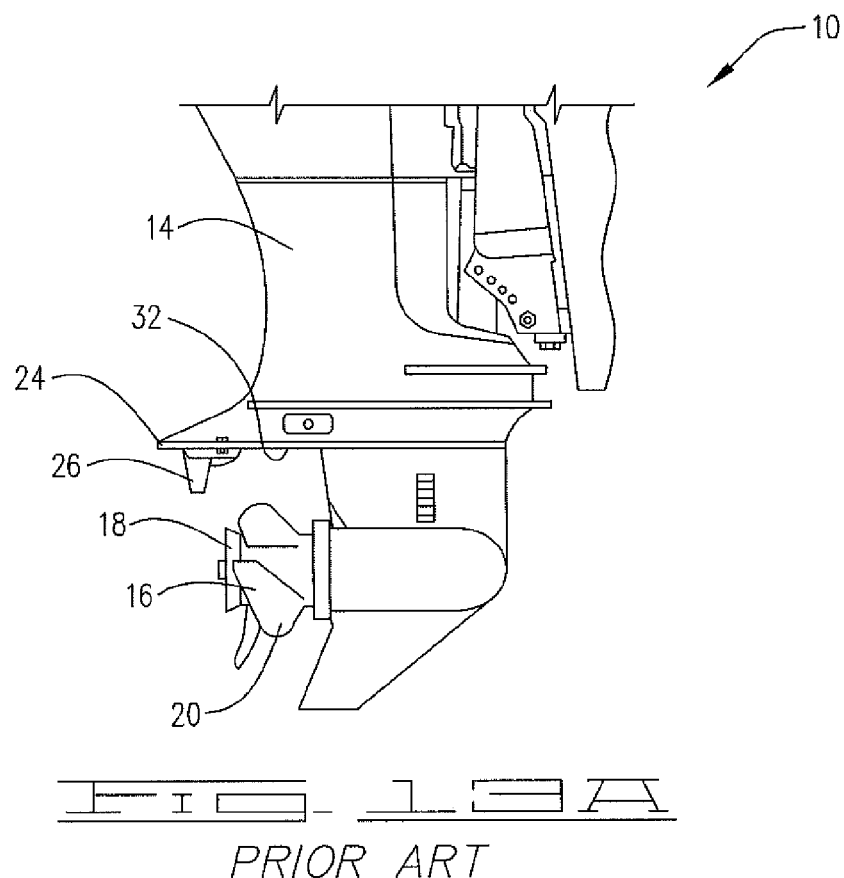
FIGS. 13A through 13G illustrate the inventive boat motor and the inventive method of attaching a boat stabilizer to a lower drive unit of a boat motor.
Figure 13B:
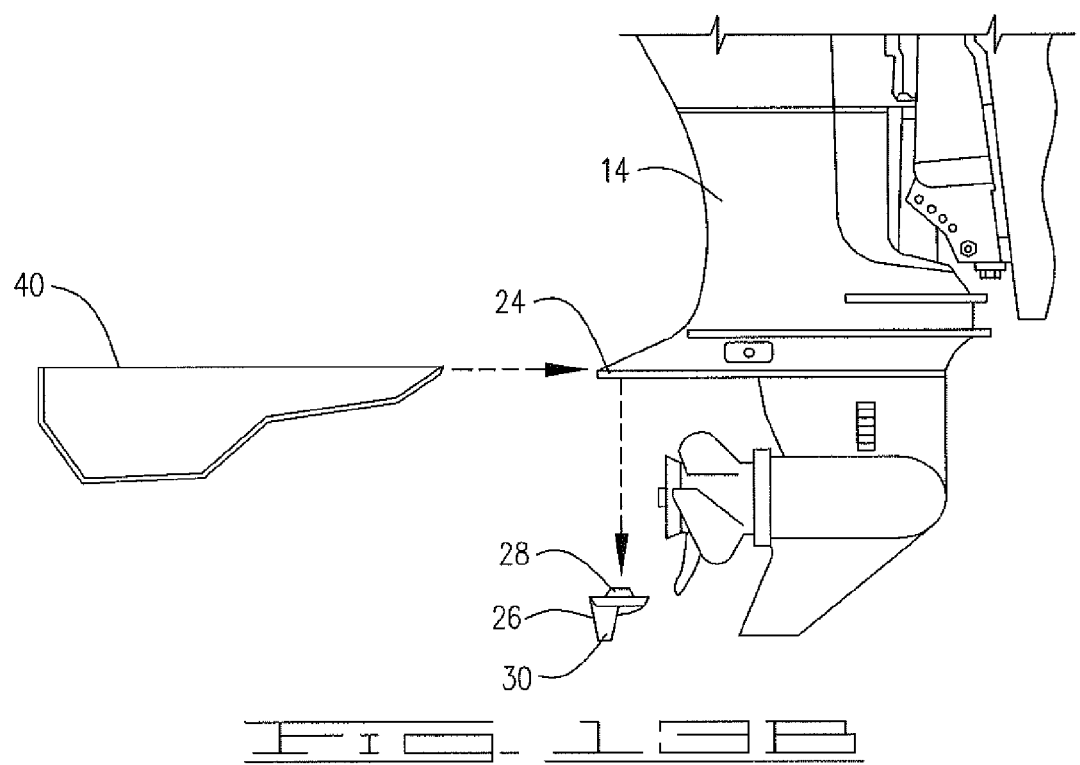

FIG. 13A illustrates a lower drive unit 14 prior to installation of the boat stabilizer 40 thereon. As best shown by FIGS. 13B and 13E, the retaining bolt 35 that retains the torque tab 26 to the bottom 32 of the anti-cavitation plate 64 is located. The retaining bolt 35 removed from the corresponding opening 36 in the anti-cavitation plate 24. The torque tab 26 is then removed from the anti-cavitation plate 34.

Figure 13C:
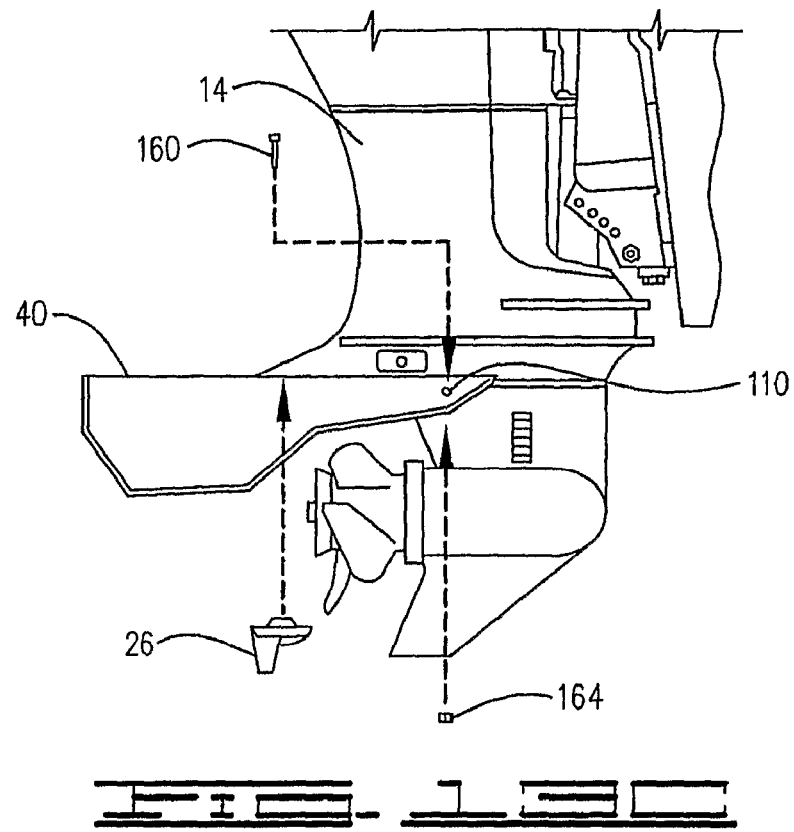
Figure 13D:
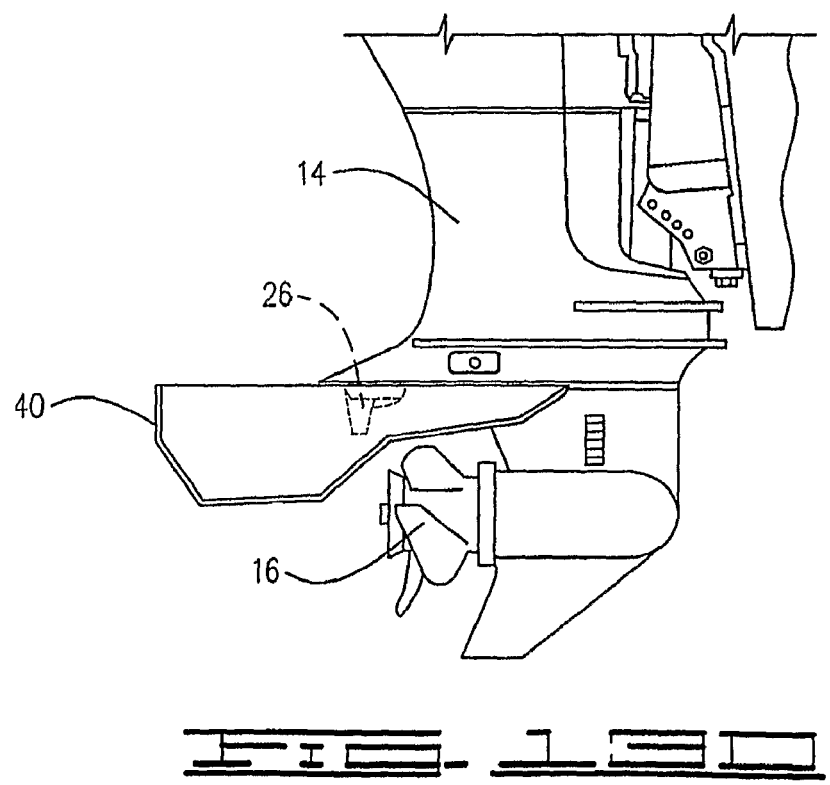
Figure 13E:
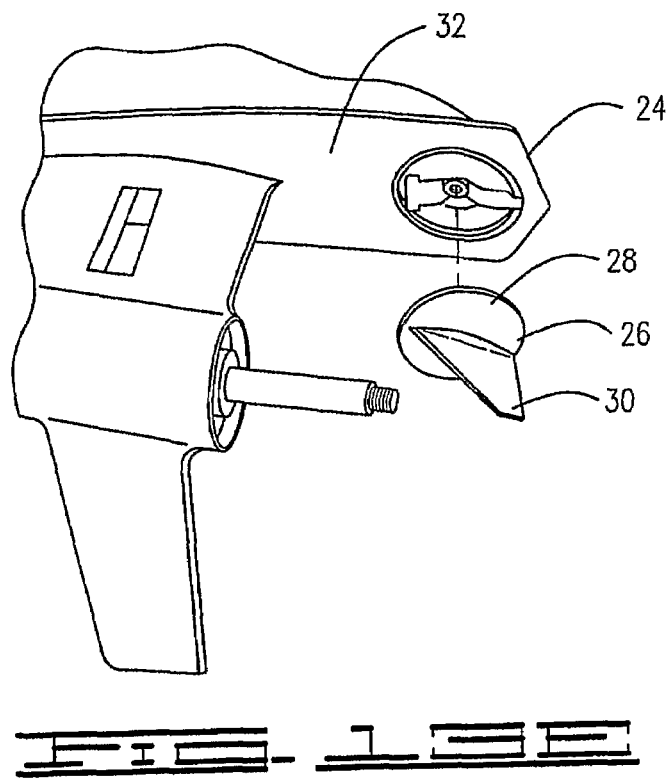
Figure 13F:
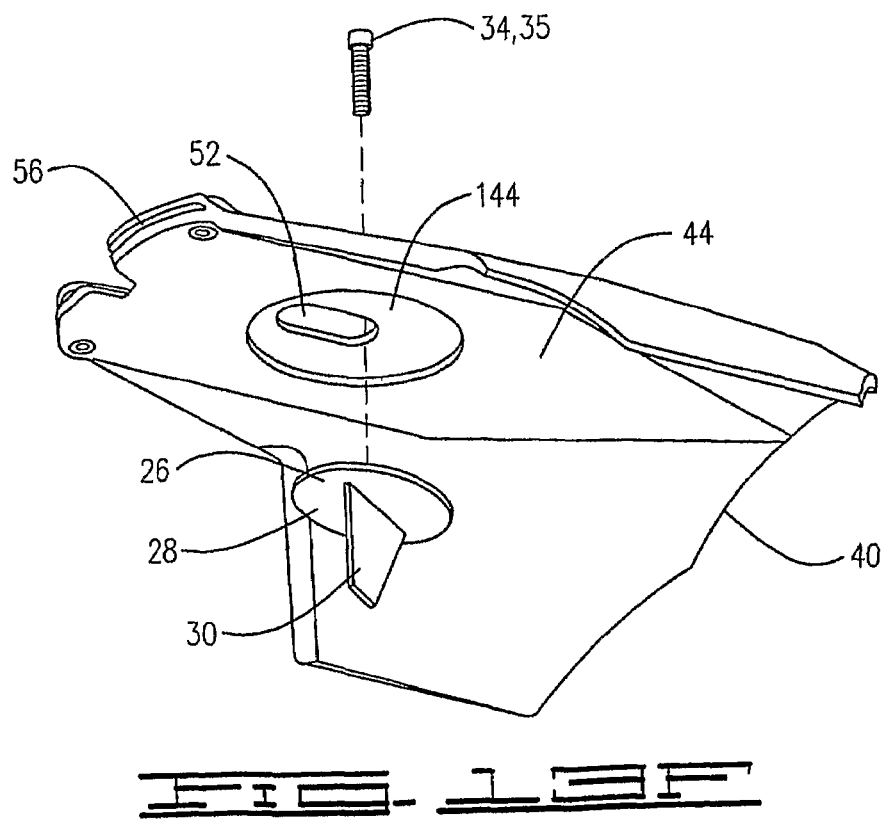
Figure 13G:
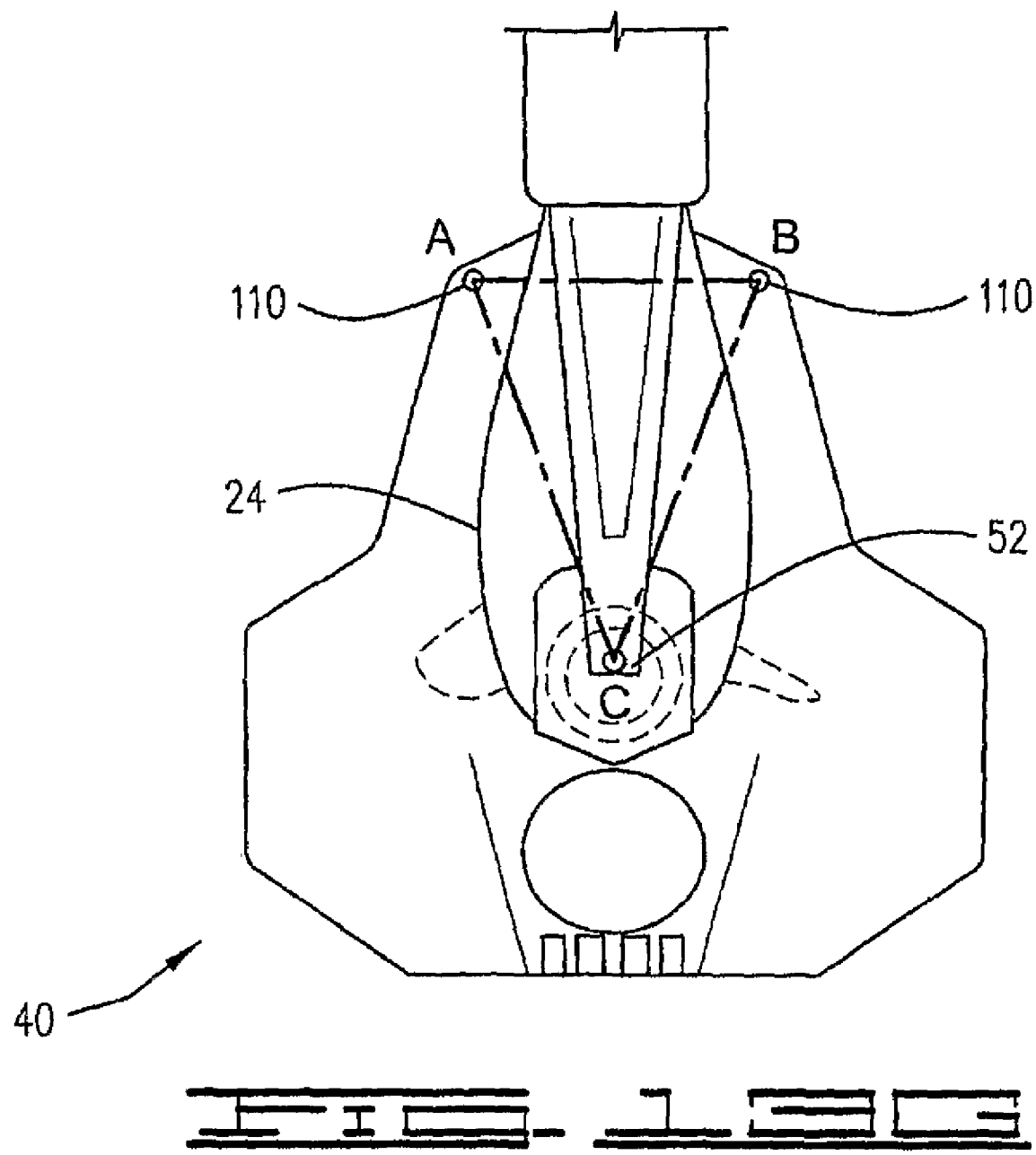
Figure 14A:
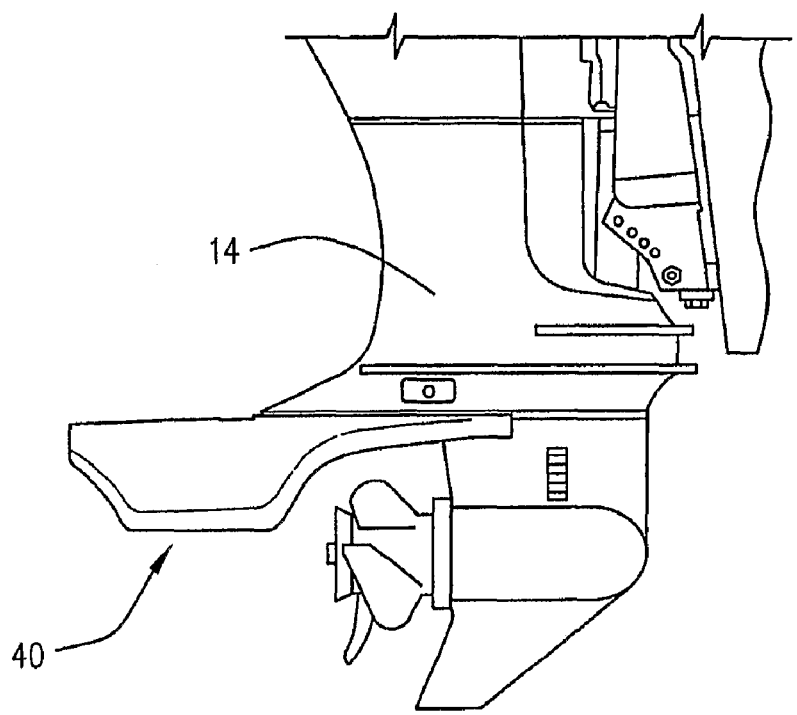
FIGS. 14A and 14B illustrate the inventive boat stabilizer (the embodiment illustrated by FIGS. 2-9) as attached to the anti-cavitation plate of a lower drive unit.
Figure 14B:
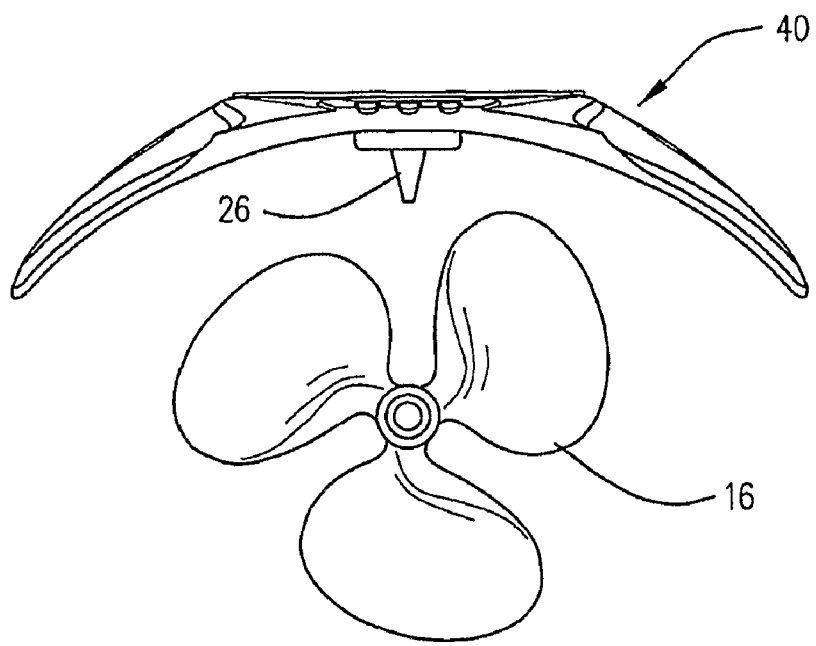
Figure 15A:
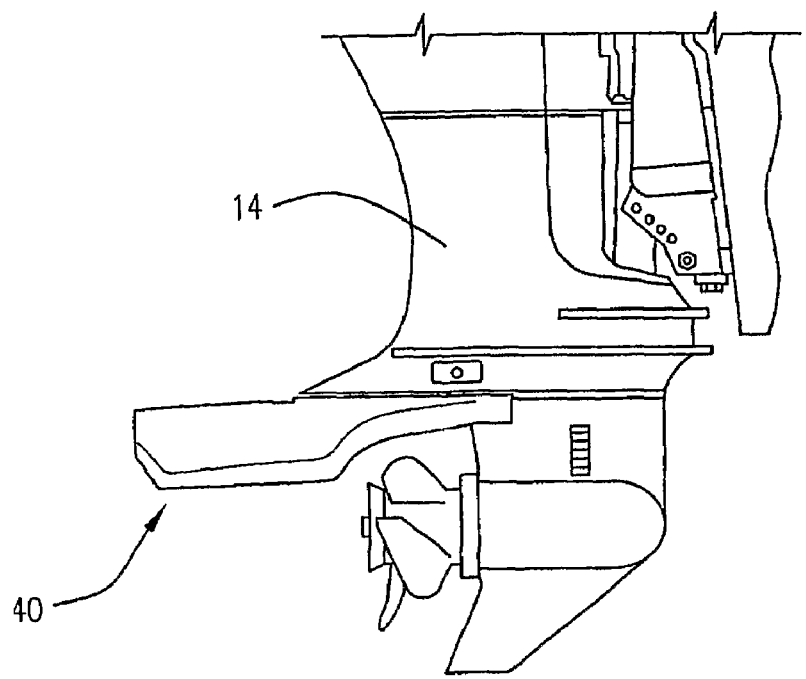
FIGS. 15A and 15B illustrate the inventive boat stabilizer (the embodiment shown by FIGS. 10-12) as attached to the anti-cavitation plate of a lower drive unit.
Figure 15B:
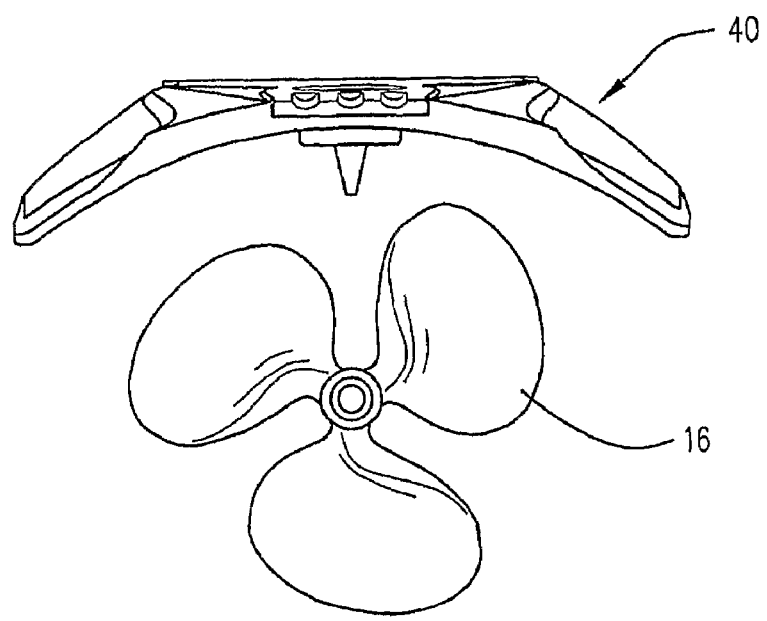

Next, as shown by FIGS. 13B and 13C, the nose portion 46 of the boat stabilizer 40 is slid onto the anti-cavitation plate 24. The boat stabilizer 40 is pushed forward onto the anti-cavitation plate 24 until it stops (i.e., until the back wall 84 of the upper notch 80 and/or back wall 94 of the lower notch 90 abut against the lower drive unit 14). The base 28 of the torque tab 26 is then inserted into the recessed area 76 on the bottom surface 44 of the boat stabilizer 40 over the opening 52. The bolt 35 is then extended through the opening 52 in the nose portion, through the opening 36 in the anti-cavitation plate 24 and through the torque tab 126. The nut 38 is then retighten to the bolt 35.

Next, a bolt 160 is extended through each of the apertures 110, and a nut 164 is tightened to each of the bolts 160 to clamp the upper surface 62 and lower surface 64 of the nose portion 46 together with the anti-cavitation plate 24 sandwiched therebetween. This method securely attaches the inventive boat stabilizer 40 to the lower drive unit 14 without permanently modifying the structure of the anti-cavitation plate 24 or otherwise permanently modifying the structure of the lower drive unit 14. The torque tab 26 and fastening device 34 securely attach the boat stabilizer 40 to the lower drive unit 14. The clamping mechanism provided by the upper and lower surfaces 162 and 164 of the slot 56 further secure the attachment.

Figure 16:
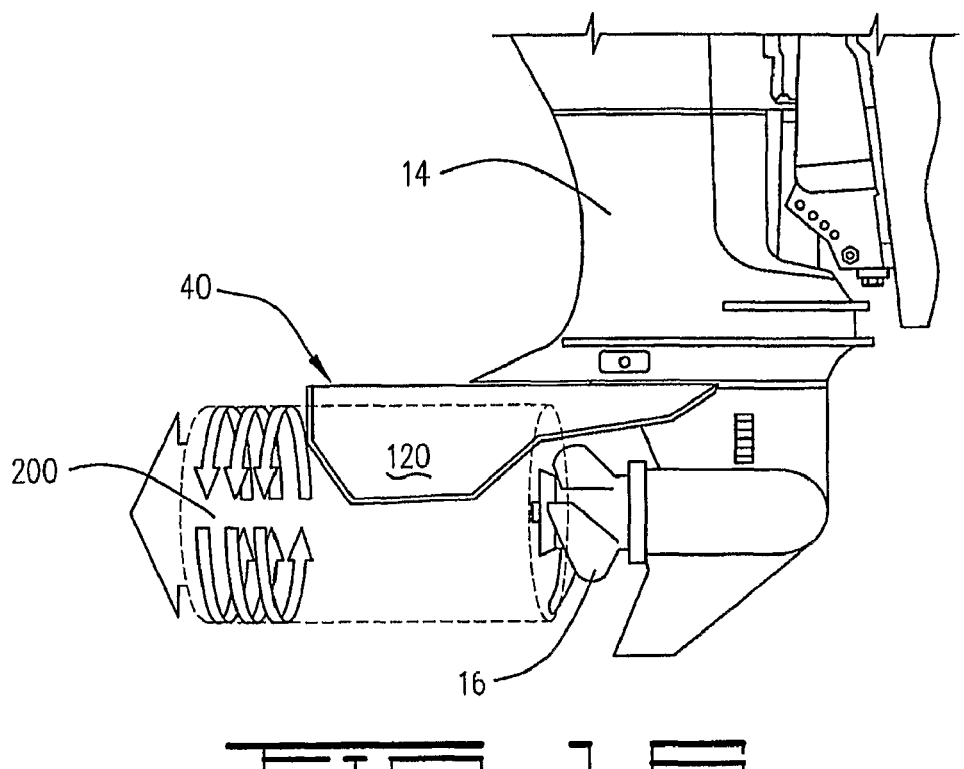
FIGS. 16 and 17 illustrate the harnessing and control of the thrust energy achieved by the inventive boat stabilizer.
Figure 17:
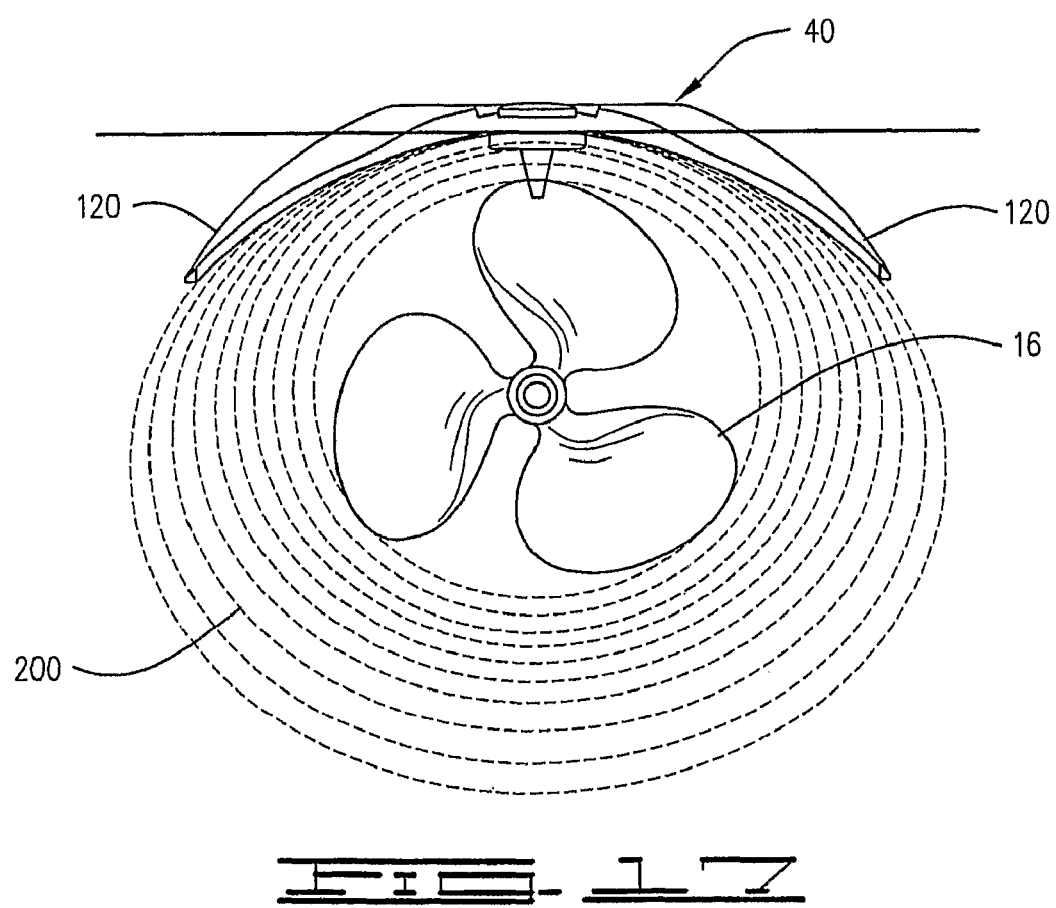

Referring now to FIG. 16, the thrust cone 200 is represented in relation to boat stabilizer 40, and propeller 16. Thrust cone 200 is shown aft of boat stabilizer 40. The wing tips 120 of the boat stabilizer 40 redirect the thrust from propeller 16 and contain potential lost energy within the thrust cone 200. FIG. 17 is a rear-view of the boat stabilizer 40 and the propeller 16, and illustrates the radial flow of the thrust as it is contained within the thrust cone 200 and the expansion of the thrust cone as it departs the boat stabilizer 40. The wing tips 120 contain the thrust within the thrust cone 200.

Figure 18:
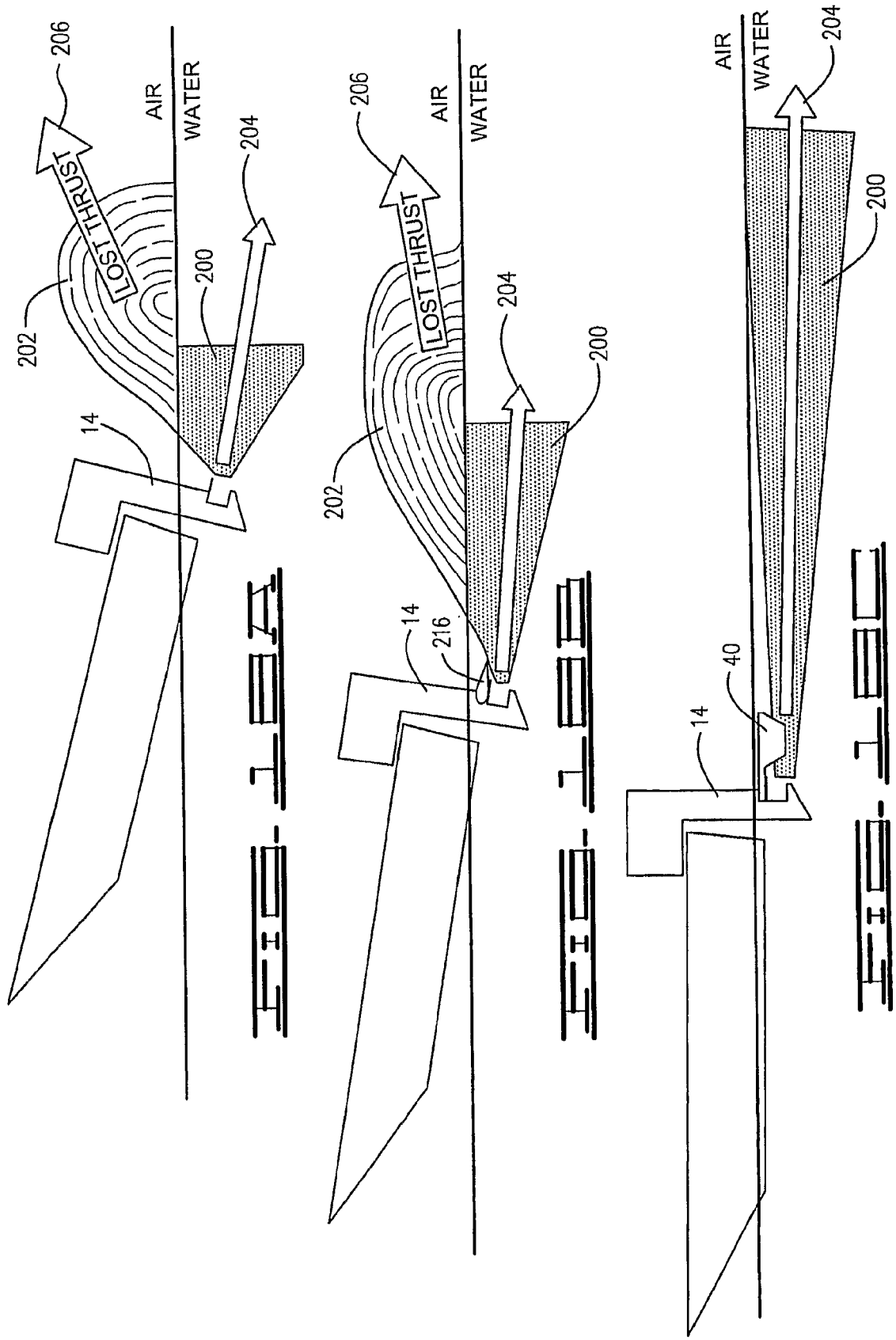
FIGS. 18A through 18C further illustrate the harnessing and control of the thrust energy achieved by the inventive boat stabilizer.
Figure 19:
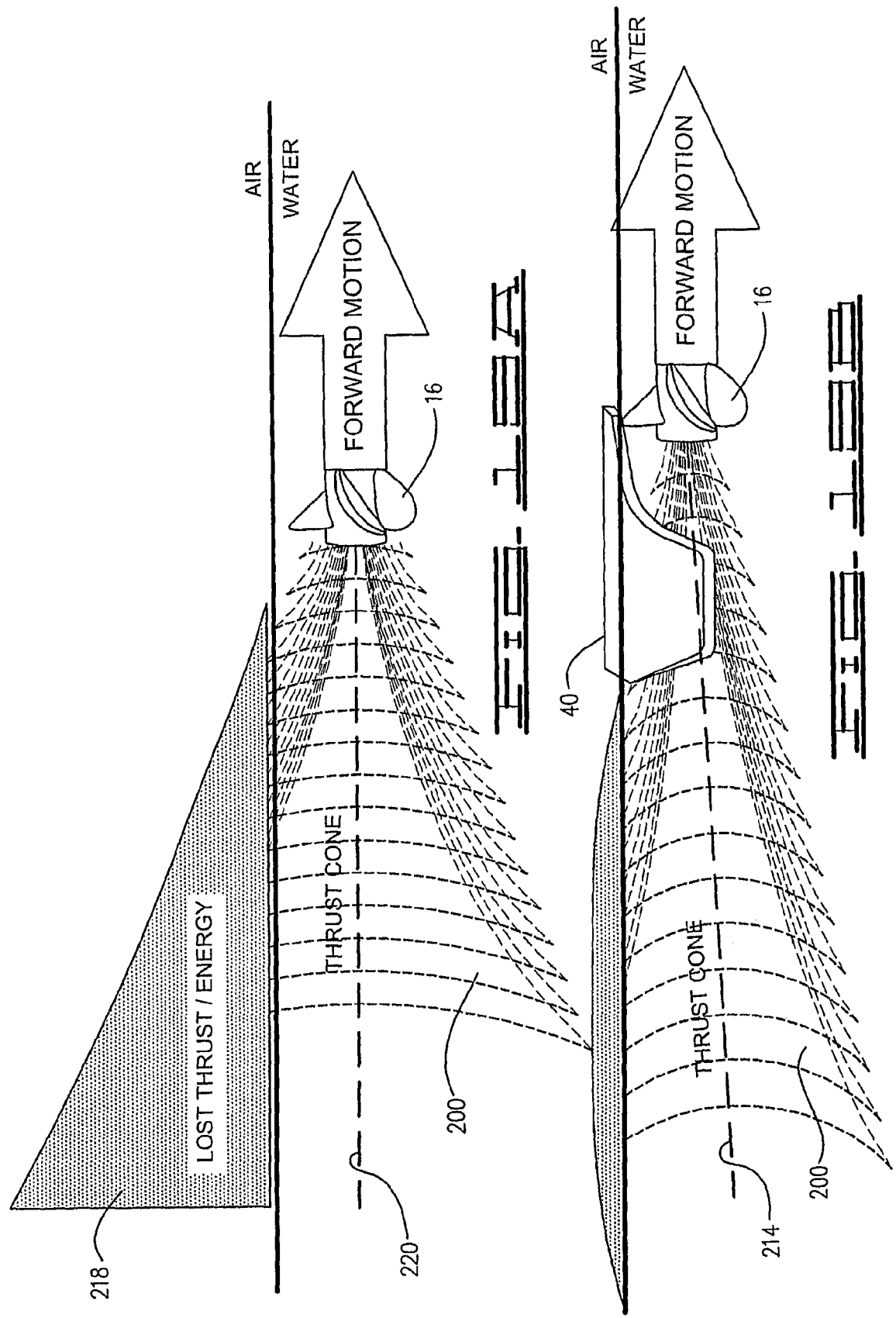
FIGS. 19A and 19B further illustrate the harnessing and control of the thrust energy achieved by the inventive boat stabilizer.
Figure 20:
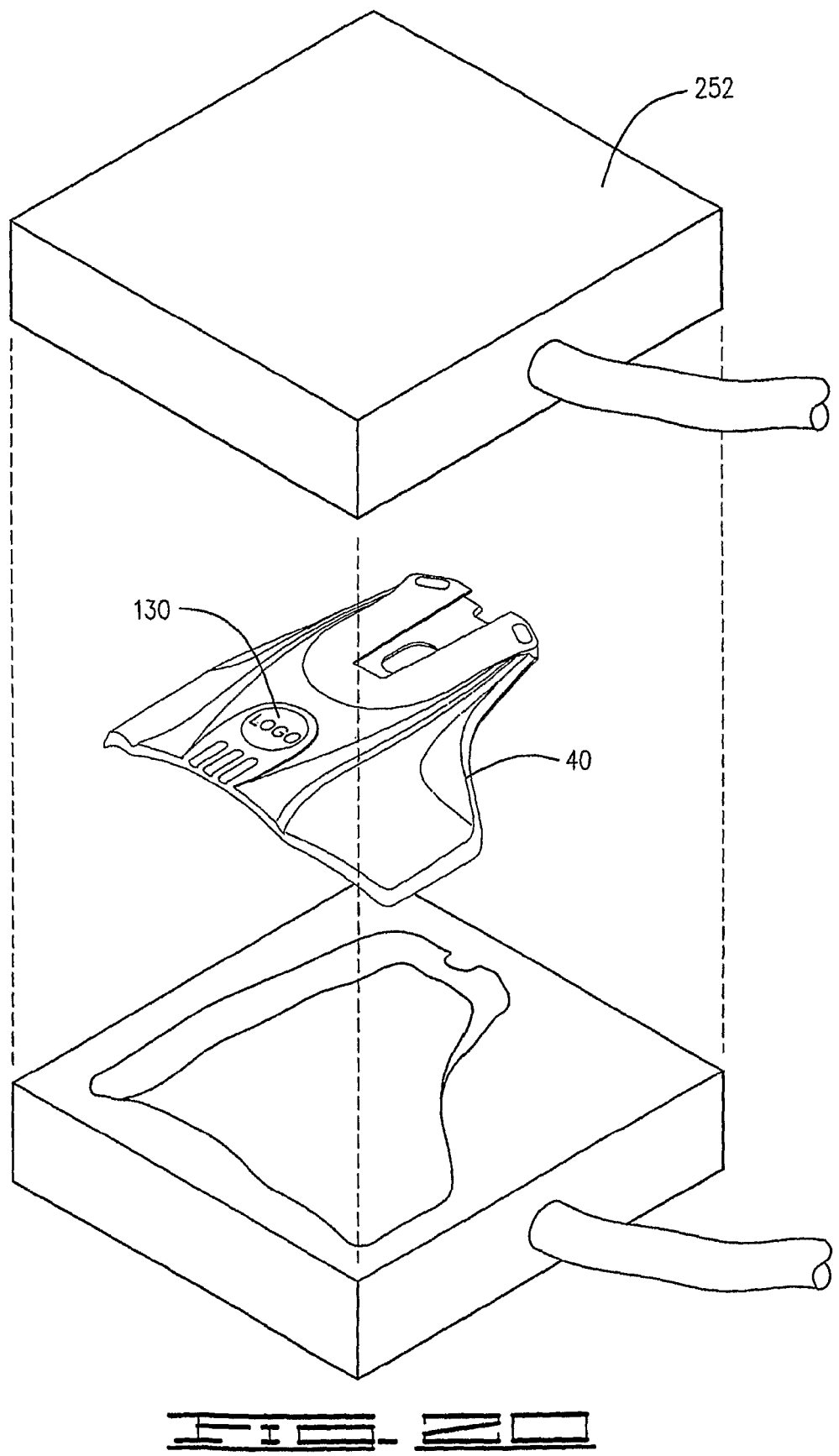
FIGS. 20 through 24 illustrate the inventive method of molding a boat stabilizer out of a polymer material with the boat stabilizer having at least one decorative element integrally embedded in the top surface thereof.
Figure 21:
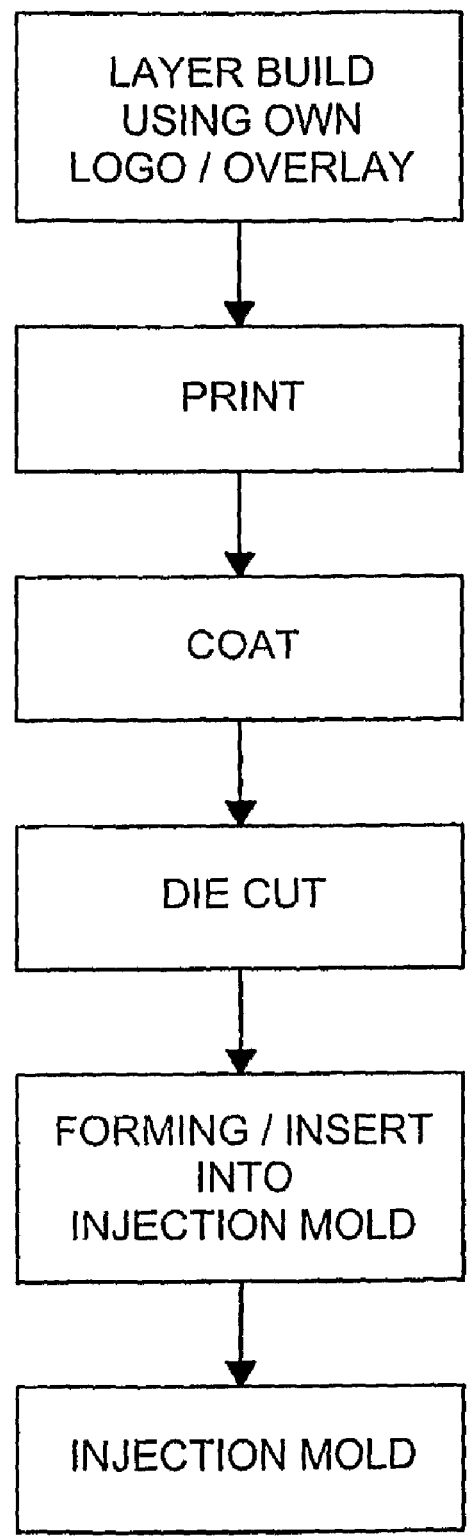
Figure 22:
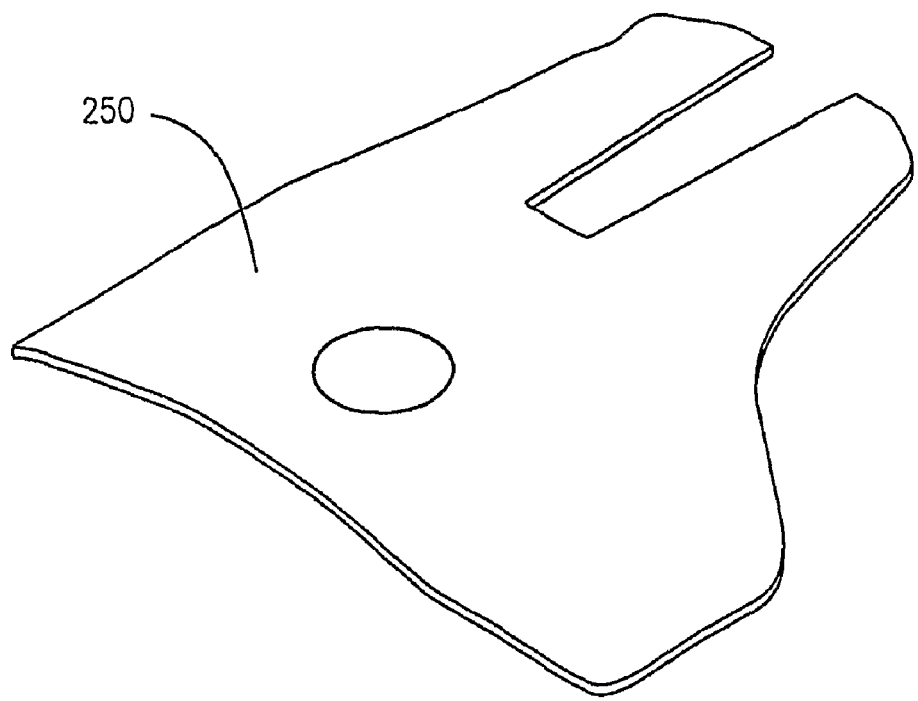
Figure 23:
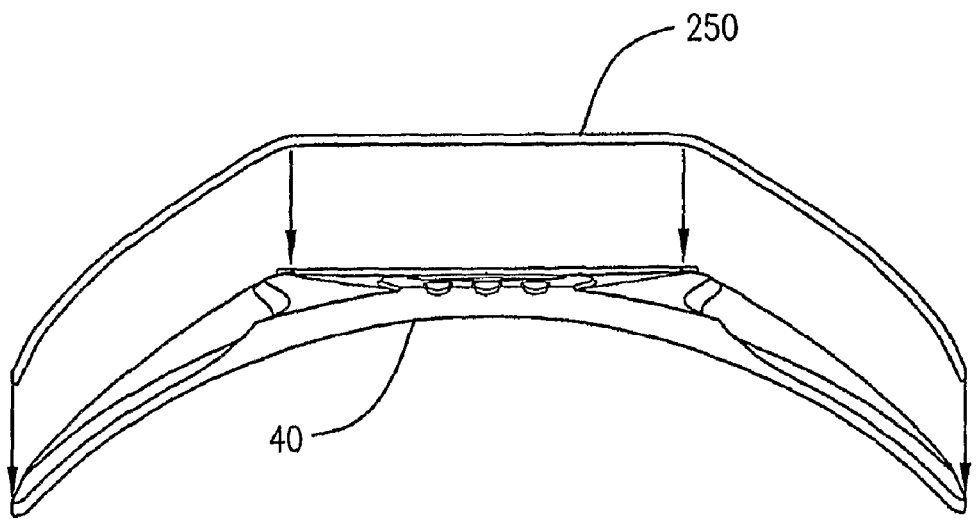
Figure 24:
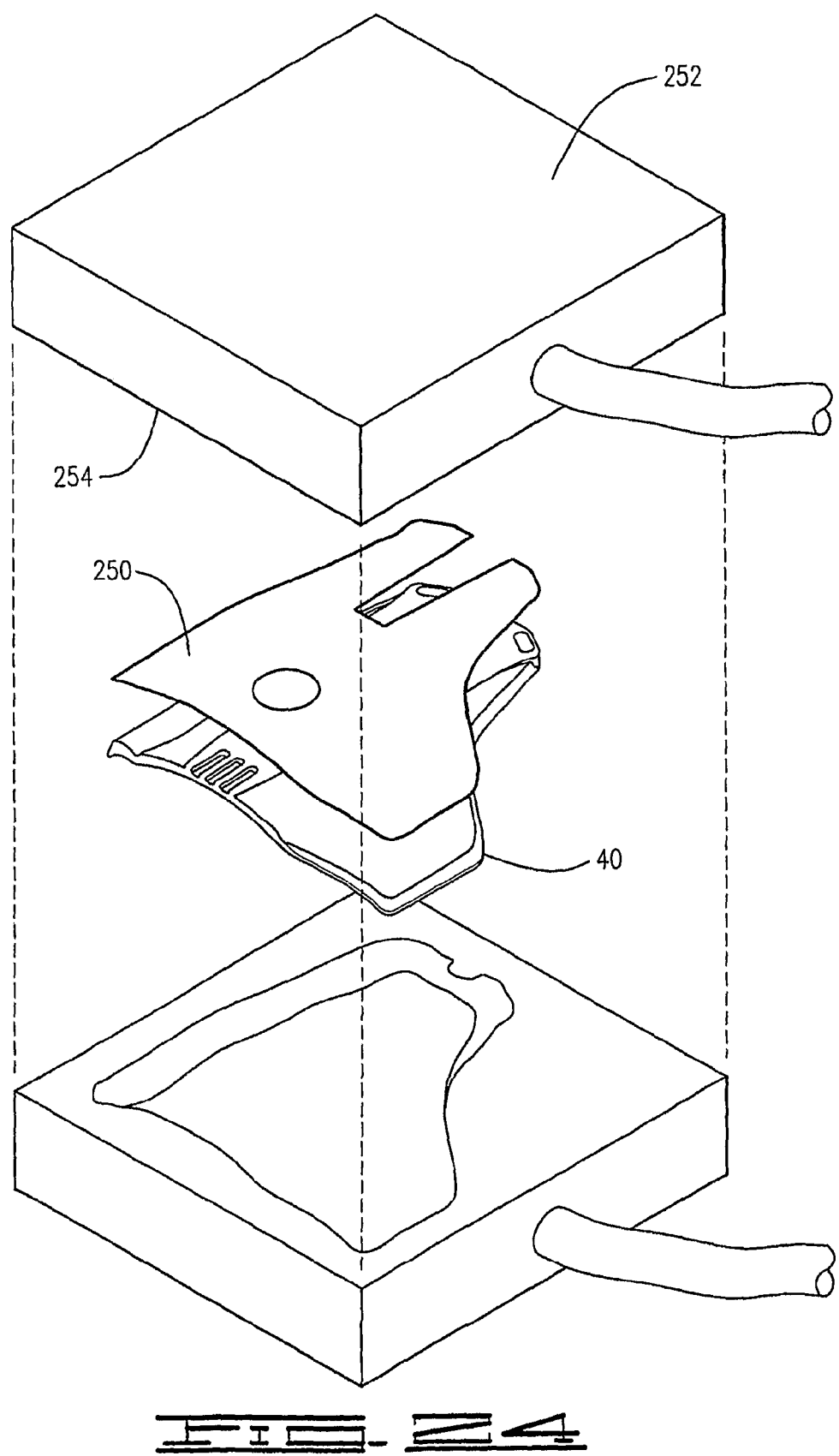

Referring now to FIGS. 18A-18C, the thrust cone 200 is shown with and without the boat stabilizer 40 attached to the boat motor. As shown by FIG. 18A, without a stabilizer 40, a large rooster tail 202 is generated immediately around the thrust cone 200. The primary direction of travel for the thrust cone 200 is shown by thrust vector 204. Lost thrust due to the rooster tail 202 is shown by lost thrust vector 206. FIG. 18B illustrates a flat stabilizer 216 attached to the boat motor. Again, a rooster tail 202 is generated immediately around the thrust cone 200, except in this case the effect is further away from the propeller 16. The primary direction of travel for the thrust cone 200 is shown by thrust vector 204. Lost thrust vector 206 again depicts the lost thrust due to cavitation and rooster tails above the surface of the water. FIG. 18C illustrates the thrust cone 200 when inventive boat stabilizer 40 is employed. A significantly longer thrust cone 200 and thrust vector 204 are achieved. The thrust cone 200 is shown remaining below the surface of the water thereby retaining the maximum energy for the thrust along thrust vector 204. FIGS. 19A and 19B further illustrated the thrust cone 200 with and without boat stabilizer 40. FIG. 19A illustrates a cone of lost energy 218 above the surface of the water while the remaining, effective part of the thrust cone 200 is shown to be below the surface of the water. The cone of lost energy 218 directly subtracts from the available energy of the thrust cone 200 as the boat has forward motion. The center line 220 of thrust cone 200 is shown to be nearly parallel with the surface of the water. FIG. 19B illustrates how the inventive boat stabilizer 40 redirects the energy from the propeller 16 downwardly and into the thrust cone 200. In this illustration, the cone of lost energy 218 in FIG. 19A is now contained by the boat stabilizer 40 and redirected along the thrust cone 200 center line 214. Center line 214 is now angled downwardly and away from the surface of the water because the boat stabilizer 40 has deflected the previously wasted energy into positive energy thereby increasing the rate of forward motion for the same power input.

The inventive boat stabilizer 40 is preferably prepared from a thermoplastic composition that comprises a thermoplastic polymer and a hydrophilic additive dispersed throughout the polymer. The hydrophilic additive comprises from about 0.01% to about 5.0% by weight of the stabilizer. A boat stabilizer prepared from such a polymeric composition experiences less hydrodynamic drag than a stabilizer lacking the hydrophilic additive. The preferred thermoplastic composition is described in U.S. patent application Ser. No. 10/749,147 (filed Dec. 30, 2003), which is assigned to the assignee of the present application and is hereby incorporated by reference herein.

The invention also includes a method of molding the boat stabilizer 40 of a polymer material with the boat stabilizer having at least one decorative element 130 embedded in the top surface 42 thereof.

Referring now to FIGS. 20-24, the method comprises the steps of:
a. placing a completed in-mold decoration ("IMD") film 250 in a mold 252 used to form the boat stabilizer 40 adjacent to a surface 254 of the mold 252 that forms the top surface 42 of the boat stabilizer;
b. after step a, injecting the polymer material into the mold 252; and
c. after step b, allowing the polymer material to harden in the mold 252 to form a boat stabilizer 40 having a decorative element 130 integrally embedded in the surface thereof.

What is claimed is:

1. A boat stabilizer that is attachable to the lower drive unit of a boat motor without permanently modifying the structure of the lower drive unit, said boat stabilizer comprising:
a top surface,
a bottom surface,
a nose portion that includes a front end and a rear end and a slot for receiving a portion of the lower drive unit of the boat motor wherein said slot has a front end adjacent to said front end of said nose portion, a rear end and opposing side walls extending from said front end to said rear end, wherein said slot extends through said front end toward said rear end of said nose portion and defines a substantially horizontal receptacle for receiving a portion of said lower drive unit, and said slot includes an upper surface and a lower surface that can be clamped together to attach said nose portion to the lower drive unit without permanently modifying the structure of the lower drive unit,
an aperture extending through said top and bottom surfaces of said nose portion and though said upper and lower surfaces of said slot adjacent to said front end of said nose portion and one of said side wall of said slot for receiving a fastening device for clamping said upper and lower surfaces of said slot together and attaching said nose portion to the lower drive unit, wherein said top surface of said boat stabilizer includes a recessed section that extends around said aperture,
a cover that fits within said recessed section and covers said aperture and any fastening device therein,
a tail opposing said nose portion, and
a main body connecting said nose portion and said tail together, said main body including a wing section for providing lift to the stern of the boat during operation of the boat,
wherein said bottom surface of said stabilizer includes a recessed area around an opening in said nose portion for receiving a torque tab associated with the lower drive unit.

2. The boat stabilizer of claim I wherein:
said boat stabilizer is attachable to the lower drive unit of the boat motor that includes an anti-cavitation plate above the propeller and wherein said torque tab attached to the bottom of the anti-cavitation plate by a torque tab fastening device that extends through the corresponding opening in the anti-cavitation plate;
said nose portion includes an opening that extends through said top and bottom surfaces of said nose portion and can be aligned with the opening in the anti-cavitation plate to receive the torque tab fastening device; and
said means associated with said nose portion for attaching said nose portion to the lower drive unit without permanently modifying the structure of the lower drive unit includes said opening in said nose portion.

3. The boat stabilizer of claim 2, wherein said opening in said nose portion is elongated and has a longitudinal axis that is substantially parallel to the longitudinal axis of the boat stabilizer.

4. The boat stabilizer of claim 1, wherein said nose portion further includes an upper notch for receiving a portion of the lower drive unit, said upper notch extending from said front end toward said rear end of said nose portion and through said top surface of said boat stabilizer and having a longitudinal axis that is substantially parallel to the longitudinal axis of said boat stabilizer.

5. The boat stabilizer of claim 1 wherein said nose portion further includes a lower notch for receiving a portion of the lower drive unit, said lower notch extending from said front end toward said rear end of said nose portion and through said bottom surface of said boat stabilizer and having a longitudinal axis that is substantially parallel to the longitudinal axis of said boat stabilizer.

6. The boat stabilizer of claim 1 wherein said slot has a depth in the range of from about 8 inches to about 12 inches.

7. The boat stabilizer of claim 1 wherein said slot has a width in the range of from about 6 inches to about 10 inches, and a thickness in the range of from about 0.25 inches to about 0.75 inches.

8. The boat stabilizer of claim 1 wherein said boat stabilizer is attachable to the lower drive unit of a boat motor that includes an anti-cavitation plate above the propeller, and said slot is capable of receiving the anti-cavitation plate.

9. The boat stabilizer of claim 8, wherein said front end of said slot has a width greater than the width of the anti-cavitation plate.

10. The boat stabilizer of claim 1, further comprising:
a pair of opposing wings, each of said wings being attached to and extending outwardly and downwardly with respect to said main body and having a leading edge and a trailing edge.

11. The boat stabilizer of claim 10 wherein each of said wings extend downwardly with respect to said main body by a distance in the range from about 0.3125 inches to about 7.785 inches.

12. The boat stabilizer of claim 11, wherein each of said wings extend outwardly with respect to the said main body by a distance in the range of from about 6 to about 9 inches.

13. The boat stabilizer of claim 10 wherein said boat stabilizer has an overall length in the range of from about 13.375 inches to about 20.125 inches.

14. The boat stabilizer of claim 13, wherein said boat stabilizer has an overall length in the range of from about 16.5 inches to about 17.875 inches.

15. The boat stabilizer of claim 10 wherein said boat stabilizer has an overall length in the range of from about 9 inches to about 13.5 inches.

16. The boat stabilizer of claim 15, wherein said boat stabilizer has an overall length in the range of from about 10.5 inches to about 12 inches.

17. The boat stabilizer of claim 1 further comprising at least one decorative element integrally embedded in the top surface of said boat stabilizer.

18. The boat stabilizer of claim 17, wherein said boat stabilizer is molded out of a polymer composition, and said decorative element is integrally embedded in said top surface of said boat stabilizer during the process used to mold the boat stabilizer.

19. The boat stabilizer of claim 18, wherein said decorative element is an overlay or logo.

20. The boat stabilizer of claim 10, wherein said boat stabilizer is integrally formed as a one-piece unit.

21. The boat stabilizer of claim 1 wherein said top surface includes a plurality of longitudinal recessed sections, said longitudinal recessed sections being positioned side by side and extending from said tail toward said nose portion.

22. A boat stabilizer that is attachable to the lower drive unit of a boat motor that includes an anti-cavitation plate positioned above the propeller and a torque tab attached to the bottom of the anti-cavitation plate by a torque tab fastening device that extends through a corresponding opening in the anti-cavitation plate, said boat stabilizer being attachable to the lower drive unit without permanently modifying the structure of the lower drive unit and comprising:
a top surface, a bottom surface, and a nose portion, a tail opposing said nose portion, a main body connecting said nose portion and tail together, said main body including a wing section for providing lift to the stern of the boat during operation of the boat, said nose portion including:
a front end;
a rear end;
an opening that is disposed between said front and rear ends, extends through said top and bottom surfaces of said nose portion and can be aligned with the opening in the anti-cavitation plate to receive a torque tab fastening device whereby the nose portion can be attached to the anti-cavitation plate by the torque tab fastening device; and
a slot extending through said front end toward said rear end and defining a substantially horizontal receptacle for receiving the anti-cavitation plate, said slot including upper and lower surfaces that can be clamped together to hold said nose portion onto the anti-cavitation plate.

23. The boat stabilizer of claim 22 wherein said opening in said nose portion is elongated and has a longitudinal axis that is substantially parallel to the longitudinal axis of the boat stabilizer.

24. The boat stabilizer of claim 22 wherein said bottom surface of said stabilizer includes a recessed area around said opening in said nose portion for receiving the torque tab of the lower drive unit.

25. The boat stabilizer of claim 22, wherein:
said slot has a front end adjacent to the front end of said nose portion, a rear end and opposing side walls extending from said front end to said rear end, said front end of said slot having a width greater than the width of the anti-cavitation plate; and
said boat stabilizer includes an aperture extending through said top and bottom surfaces of said nose portion and through said upper and lower surfaces of said slot adjacent to said front end and a side wall of said slot for receiving a fastening device for clamping said upper and lower surfaces of said slot together.

26. A boat motor, comprising:
an engine;
a lower drive unit attached to said engine, said lower drive unit including a propeller, an anti-cavitation plate positioned above the propeller, and a torque tab attached to the bottom surface of the anti-cavitation plate by a torque tab fastening device that extends through a corresponding opening in the anti-cavitation plate; and
a boat stabilizer that can be removably attached to said lower drive unit to provide lift to the stem of the boat during operation of the boat without permanently modifying the structure of said lower drive unit, said boat stabilizer comprising a top surface, a bottom surface, a nose portion, a tail opposing said nose portion, and a main body connecting said nose portion and said tail together and including a wing section for providing lift to the stem of the boat during operation of the boat, said nose portion including:
a front end, a rear end, an opening that is disposed between said front and rear ends, extends through said top and bottom surfaces of said nose portion and can be aligned with the opening in the anti-cavitation plate to receive a torque tab fastening device whereby the nose portion can be attached to the anti-cavitation plate by the torque tab fastening device, and a slot extending through said front end toward said rear end of said nose portion and defining a substantially horizontal receptacle for receiving the anti-cavitation plate, said slot including an upper surface and a lower surface that can be clamped together to hold said nose portion onto the anti-cavitation plate.

27. The boat motor of claim 26 wherein said opening in said nose portion is elongated and has a longitudinal axis that is substantially parallel to the longitudinal axis of the boat stabilizer.

28. The boat motor of claim 26 wherein said bottom surface of said stabilizer includes a recessed area around said opening in said nose portion for receiving the torque tab of said lower drive unit.

29. The boat motor of claim 26, wherein:
said slot of said nose portion has a front end adjacent to the front end of said nose portion, a rear end and opposing side walls extending from said front end of said slot to said rear end of said slot, and said front end of said slot has a width greater than the width of said anti-cavitation plate; and said boat stabilizer includes an aperture extending through said top and bottom surfaces of said nose portion and through said upper and lower surfaces of said slot adjacent to said front end and a side wall of said slot for receiving a fastening device for clamping said upper and lower surfaces of said slot together.

30. The boat motor of claim 26 wherein said removable boat stabilizer further comprises a pair of opposing wings, each of said wings being attached to and extending outwardly and downwardly with respect to said main body and having a leading edge and a trailing edge.

31. The boat motor of claim 30 wherein each wing further includes an indentation in the top surface thereof, said indentation being positioned adjacent to the leading edge of the wing tip.

32. The boat motor of claim 30 wherein each of said wings extend downwardly with respect to said main body by a distance in the range from about 0.3125 inches to about 7.785 inches.

33. The boat motor of claim 30, wherein each of said wings extend outwardly with respect to the said main body by a distance in the range of from about 6 to about 9 inches.

34. The boat motor of claim 30 wherein said boat stabilizer has an overall length in the range of from about 13.375 inches to about 20.125 inches.

35. The boat motor of claim 34 wherein said boat stabilizer has an overall length in the range of from about 9 inches to about 13.5 inches.

36. The boat motor of claim 35 wherein said boat stabilizer further comprises at least one decorative element integrally embedded in the top surface of said boat stabilizer.

37. The boat motor of claim 36 wherein said boat stabilizer is molded out of a polymer composition, and said decorative element is integrally embedded in the top surface of said boat stabilizer during the process used to mold the boat stabilizer.

38. The boat motor of claim 37, wherein said decorative element is an overlay or logo.

39. The boat motor of claim 36, wherein said boat stabilizer is integrally formed as a one-piece unit.

40. A method of attaching a boat stabilizer having a nose portion including an opening extending therethrough, a tail and a main body connecting the nose portion and tail together and including a wing section to the anti-cavitation plate of a lower drive unit of a boat motor without permanently modifying the structure of the anti-cavitation plate, said method comprising:

locating the retaining bolt that retains the torque tab to the bottom of the anti-cavitation plate, removing the retaining bolt from the corresponding opening in the anti-cavitation plate, and removing the torque tab from the anti-cavitation plate;

positioning the nose portion of the boat stabilizer above, below or around the anti-avitation plate such that the opening extending through the nose portion aligns with the opening in the anti-cavitation plate that contained the torque tab retaining bolt;

extending a bolt through the opening in the anti-cavitation plate that originally contained the torque tab retaining bolt and through the opening in the nose portion of the boat stabilizer; and attaching a nut to the bolt extending through the opening in the anti-cavitation plate and the opening in the nose portion of the boat stabilizer to fasten the nose portion of the boat stabilizer to the anti-cavitation plate.

41. A boat stabilizer that is attachable to the lower drive unit of a boat motor without permanently modifying the structure of the lower drive unit, said boat stabilizer comprising:

a top surface, said top surface of said boat stabilizer includes a recessed section;

a bottom surface;

a nose portion including:
a front end;
a rear end; and
a slot for receiving a portion of the lower drive unit of the boat motor;

a tail opposing said nose portion;

a main body connecting said nose portion and said tail together, said main body including:
a wing section for providing lift to the stern of the boat during operation of the boat, and means associated with said nose portion for attaching said nose portion to the lower drive unit without permanently modifying the structure of the lower drive unit, said means including said slot;

wherein said slot extends through said front end toward said rear end of said nose portion and defines a substantially horizontal receptacle for receiving a portion of the lower drive unit, said slot including:
an upper surface;
a lower surface that can be clamped together to attach said nose portion to the lower drive unit without permanently modifying the structure of the lower drive unit;

wherein said lower drive unit of said boat motor includes an anti-cavitation plate above the propeller, and said slot is capable of receiving the anti-cavitation plate;

wherein said slot includes:
a front end adjacent to the front end of said nose portion;
a rear end; and
opposing side walls extending from said front end to said rear end, wherein said front end of said slot has a width greater than the width of the anti-cavitation plate;

an aperture extending through said top and bottom surfaces of said nose portion and though said upper and lower surfaces of said slot adjacent to said front end and a side wall of said slot for receiving a fastening device for clamping said upper and lower surfaces of said slot together and attaching said nose portion to the anti-cavitation plate without permanently modifying the structure of the anti-cavitation plate, wherein said recessed section extends around said aperture; and a cover that fits within said recessed section and covers said aperture and any fastening device therein.

* * * * *